(12) United States Patent
Kim et al.

(10) Patent No.: US 8,028,687 B2
(45) Date of Patent: Oct. 4, 2011

(54) DIAMOND TOOL

(75) Inventors: Soo-Kwang Kim, Portfino, CA (US);
Jong-Ho Kim, Seoul (KR); Hee-Dong Park, Kyungki-do (KR)

(73) Assignees: Ehwa Diamond Industrial Co., Ltd., Kyungki-do (KR); General Tool, Inc., Irving, CA (US)

( * ) Notice: Subject to any disclaimer, the term of this patent is extended or adjusted under 35 U.S.C. 154(b) by 731 days.

(21) Appl. No.: 11/908,067

(22) PCT Filed: Feb. 13, 2006

(86) PCT No.: PCT/KR2006/000507
§ 371 (c)(1),
(2), (4) Date: Sep. 7, 2007

(87) PCT Pub. No.: WO2006/088302
PCT Pub. Date: Aug. 24, 2006

(65) Prior Publication Data
US 2008/0163857 A1      Jul. 10, 2008

(30) Foreign Application Priority Data
Feb. 15, 2005  (KR) .................. 10-2005-0012458

(51) Int. Cl.
*B28D 1/12* (2006.01)
(52) U.S. Cl. ........................................ 125/22
(58) Field of Classification Search ............ 125/22
See application file for complete search history.

(56) References Cited

U.S. PATENT DOCUMENTS

| | | | | | |
|---|---|---|---|---|---|
| 1,488,912 | A | * | 4/1924 | Foerster | 125/22 |
| 1,866,356 | A | * | 7/1932 | Jones | 125/22 |
| 2,811,960 | A | * | 11/1957 | Fessel | 125/15 |
| 5,871,005 | A | * | 2/1999 | Sueta | 125/15 |
| 6,159,286 | A | * | 12/2000 | Sung | 117/79 |
| 6,615,816 | B2 | | 9/2003 | Ogata | |
| 6,626,167 | B2 | * | 9/2003 | Kim et al. | 125/15 |

(Continued)

FOREIGN PATENT DOCUMENTS

CN       1323252 A    * 11/2001

(Continued)

OTHER PUBLICATIONS

Chinese Office Action for Corresponding Chinese Application.*

*Primary Examiner* — Maurina Rachuba
(74) *Attorney, Agent, or Firm* — Renner, Otto, Boisselle & Sklar, LLP

(57) ABSTRACT

The invention provides a segment type diamond tool capable of improving cutting rate and reducing the amount of fine debris generated during cutting by properly arranging diamond particles in a cutting segment of the diamond tool. In the invention, the layers of diamond particles are arranged such that cutting grooves formed on a workpiece by trailing layers of diamond particles are arranged between cutting grooves formed thereon by leading layers of diamond particles, respectively, in cutting of the work piece. The cutting segment has high-concentration and low-concentration areas. The high-concentration area shows a concentration higher than an average concentration and the low concentration area shows a concentration lower than the average concentration. Also, at least one low concentration area is formed on the leading and/or trailing section of the cutting segment. The diamond tool of the invention ensures superior cutting rate and reduced amount of fine debris generated during cutting.

26 Claims, 26 Drawing Sheets

U.S. PATENT DOCUMENTS

| | | | |
|---|---|---|---|
| 6,638,152 B1 * | 10/2003 | Kim et al. | 451/541 |
| 6,890,250 B1 * | 5/2005 | Kim et al. | 451/541 |
| 7,178,517 B1 * | 2/2007 | Yu | 125/13.01 |
| 7,337,775 B2 * | 3/2008 | Kim et al. | 125/22 |

FOREIGN PATENT DOCUMENTS

| | | | |
|---|---|---|---|
| CN | 1410242 A * | 4/2003 | |
| JP | 03161278 | 7/1991 | |
| JP | 07266239 | 10/1995 | |
| JP | 2003-039332 | 2/2003 | |
| JP | 2005-345280 | 12/2003 | |
| KR | 2001-60680 | 9/2001 | |
| KR | 10-0067394 | 8/2003 | |
| KR | 2003-55532 | 8/2003 | |
| KR | 2003-67394 A * | 8/2003 | |
| MX | 2005/003311 | 10/2005 | |
| WO | 2005/014243 | 2/2005 | |

* cited by examiner

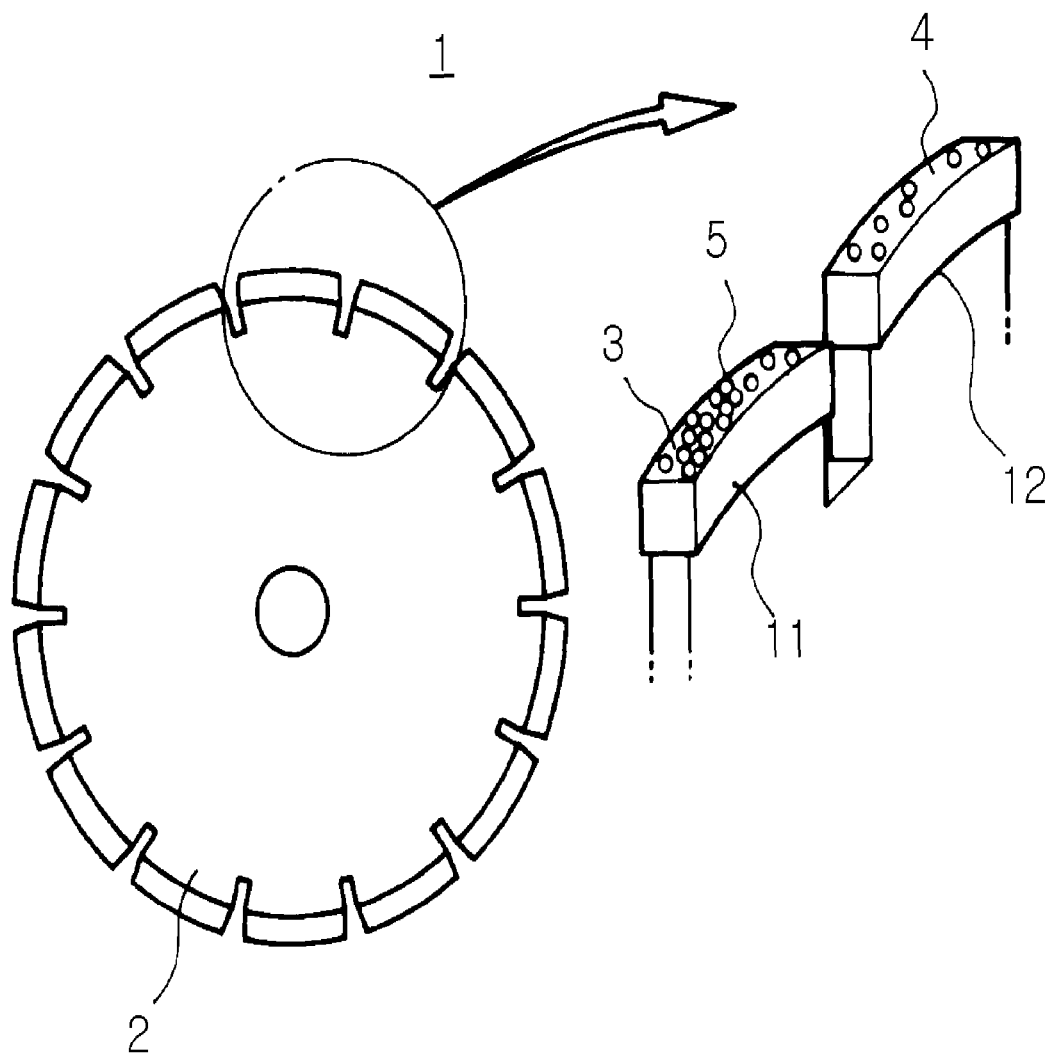
[Fig. 1]

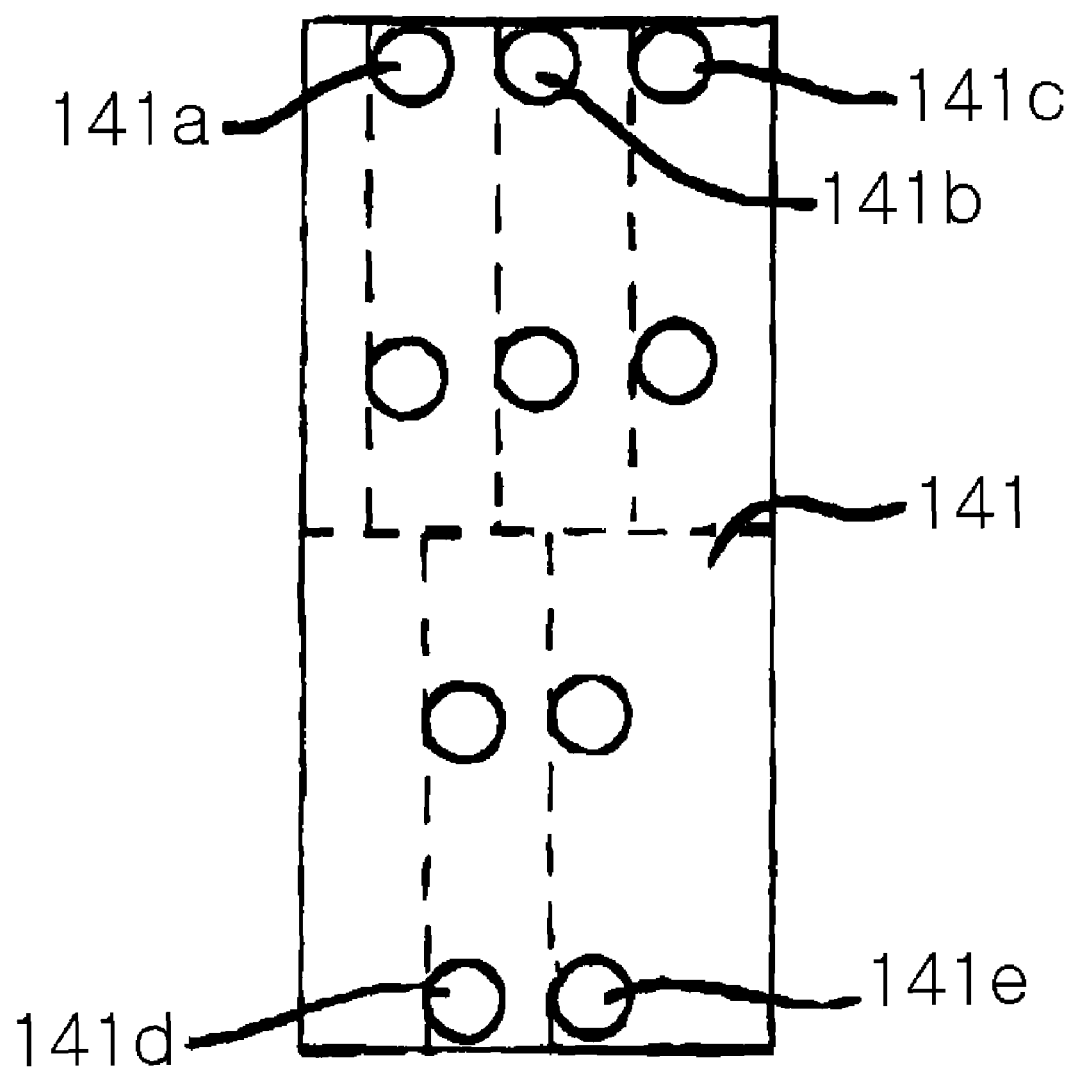
[Fig. 2]

[Fig. 3]
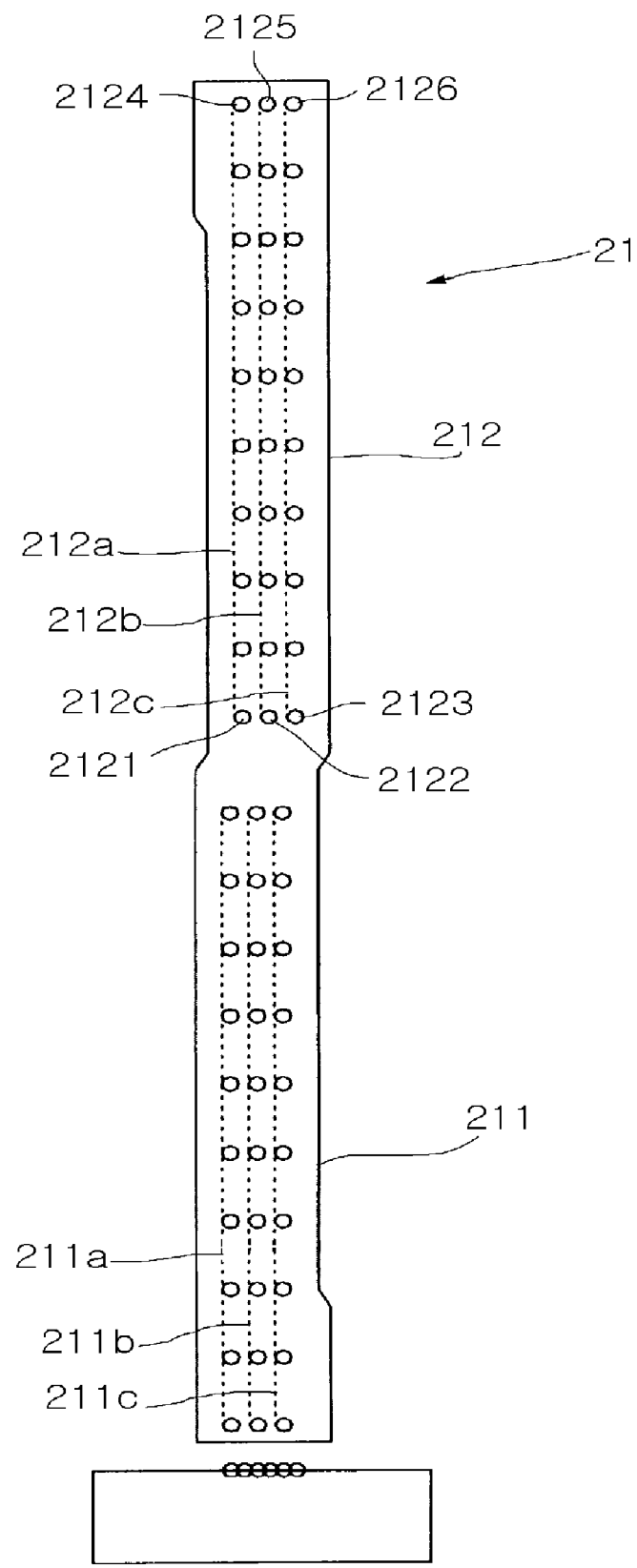

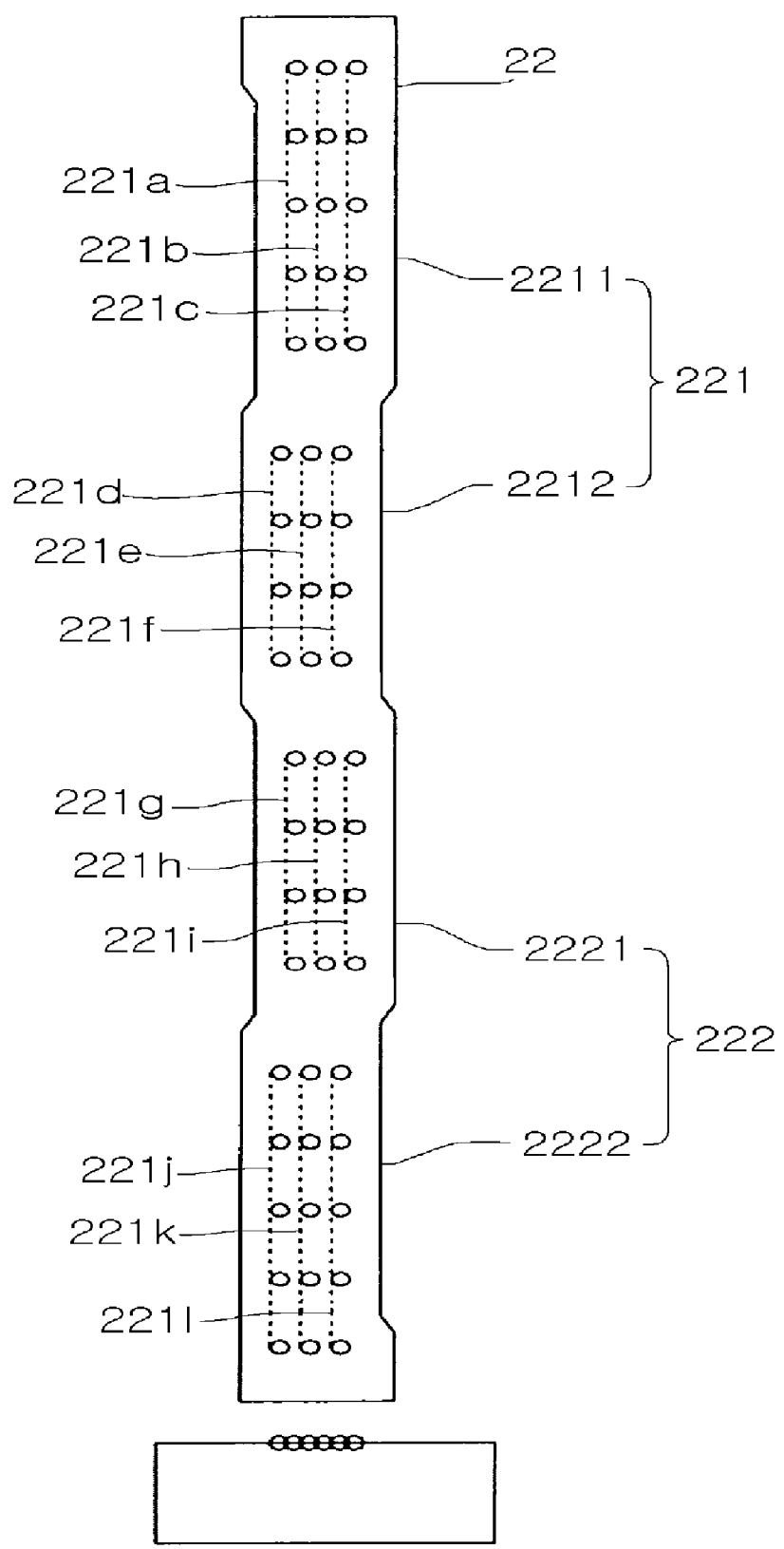
[Fig. 4]

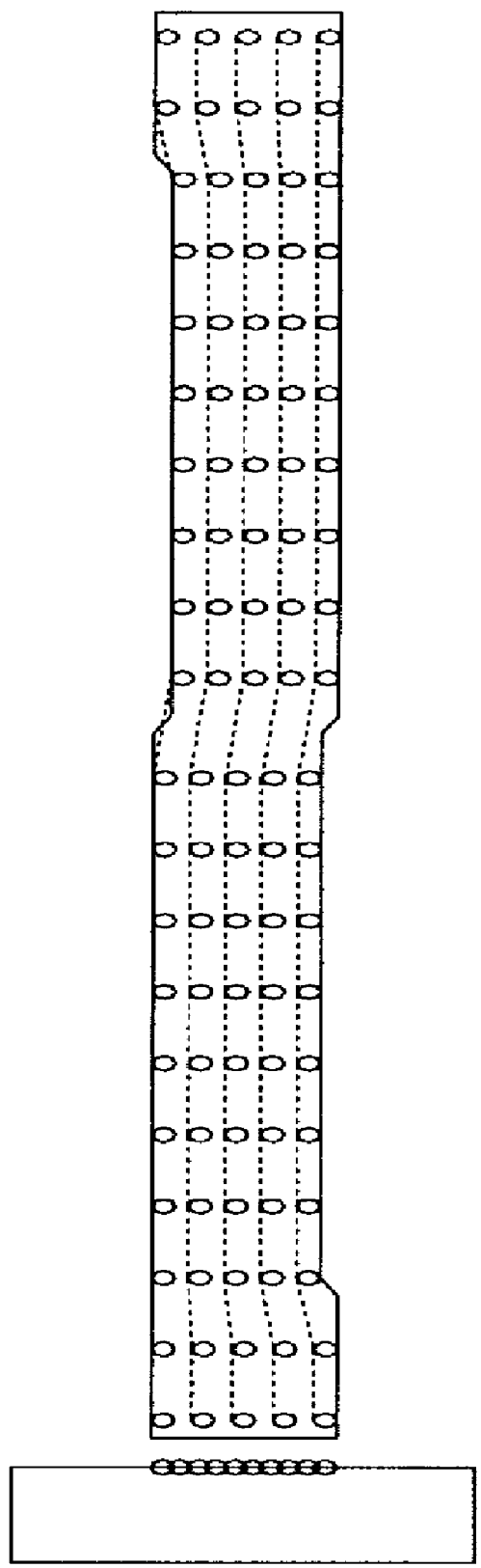
[Fig. 5]

[Fig. 6]
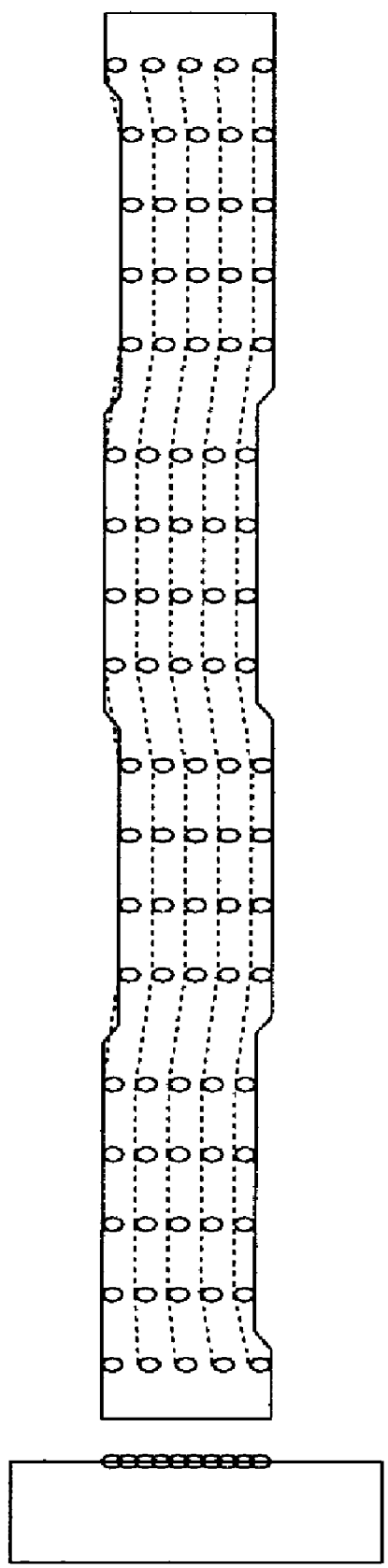

[FIG. 7]
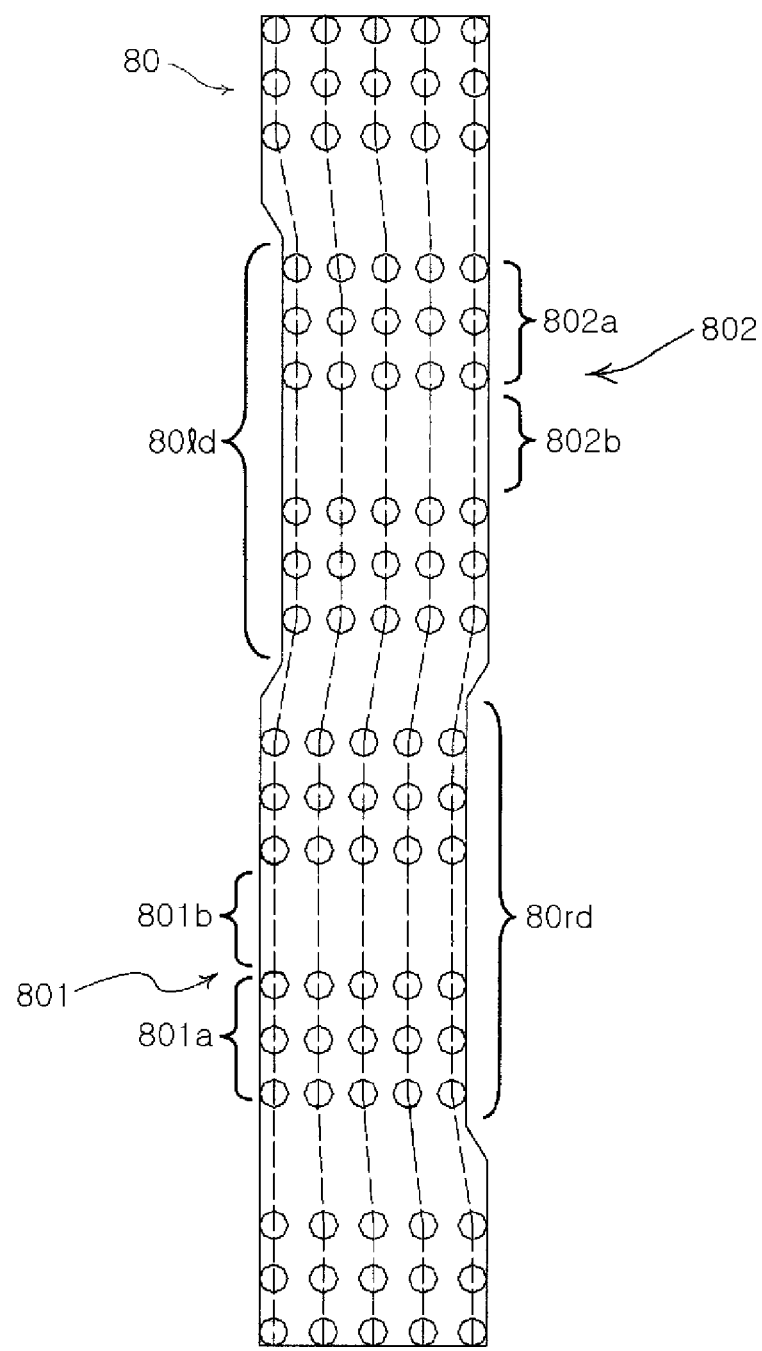

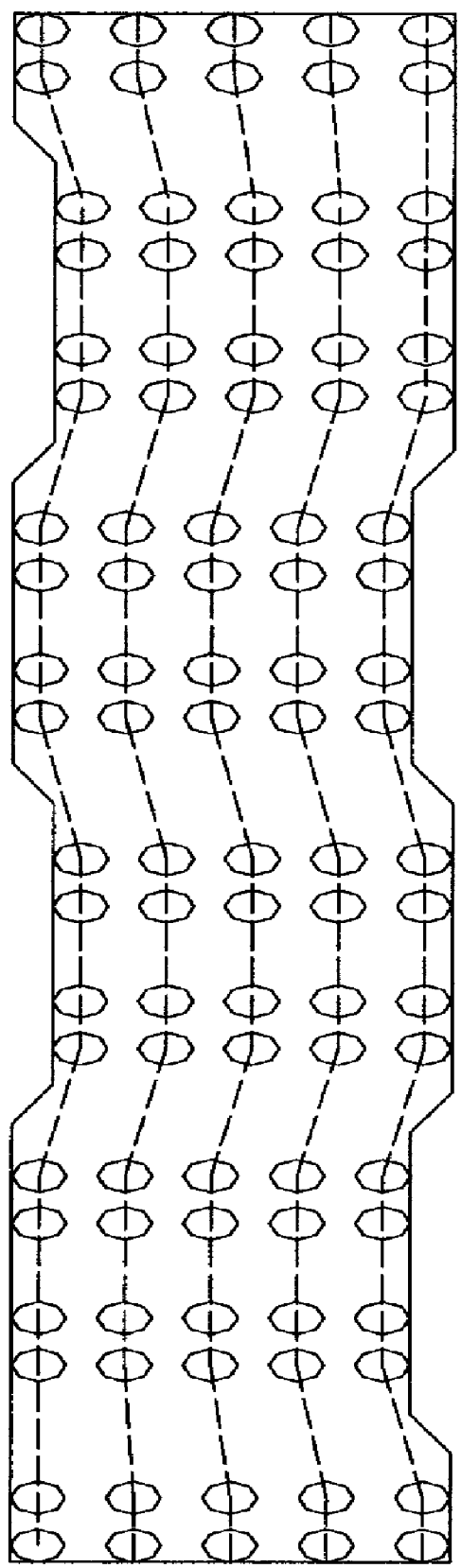
[Fig. 8]

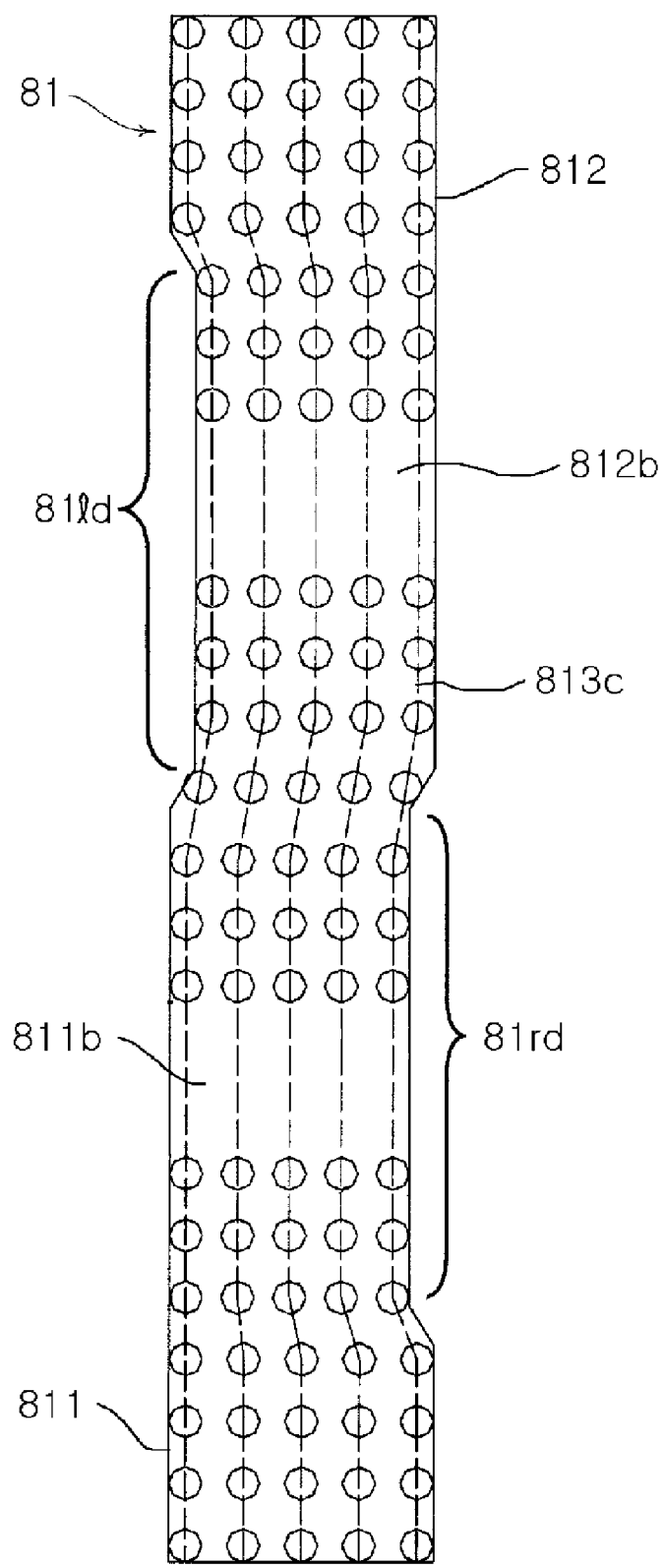
[Fig. 9]

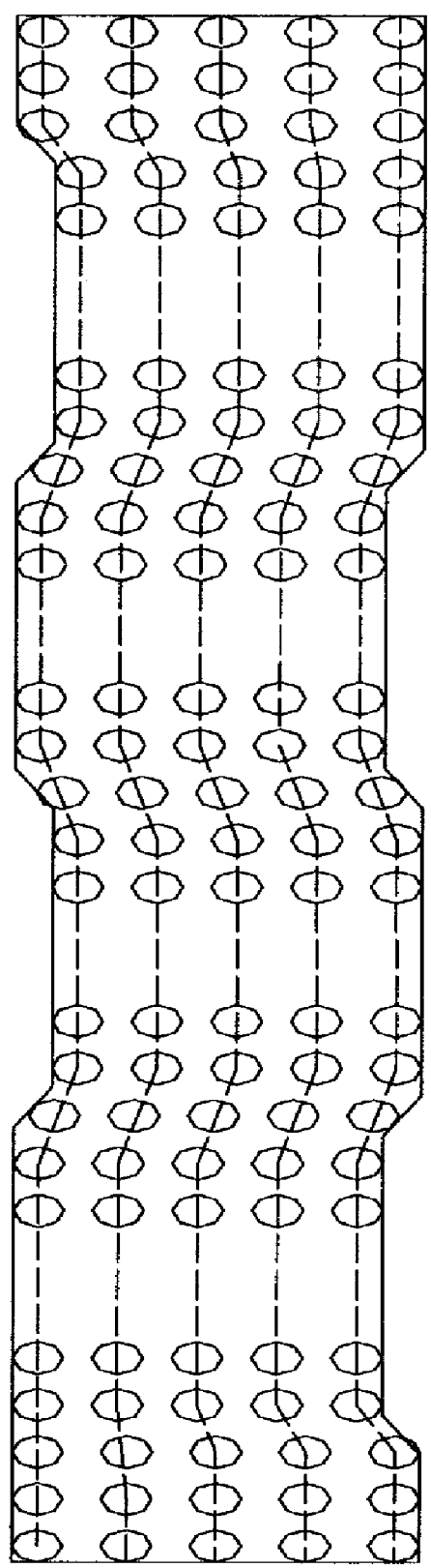
[Fig. 10]

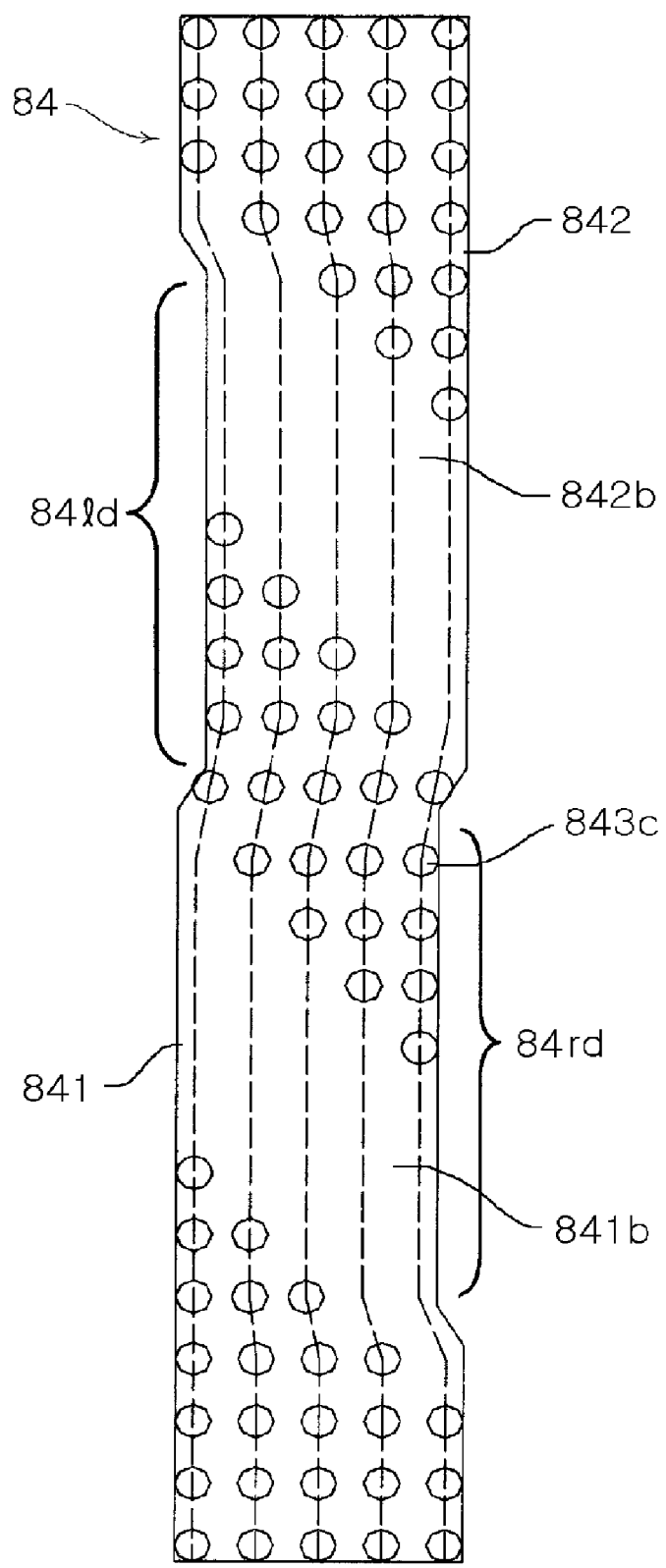
[Fig. 11]

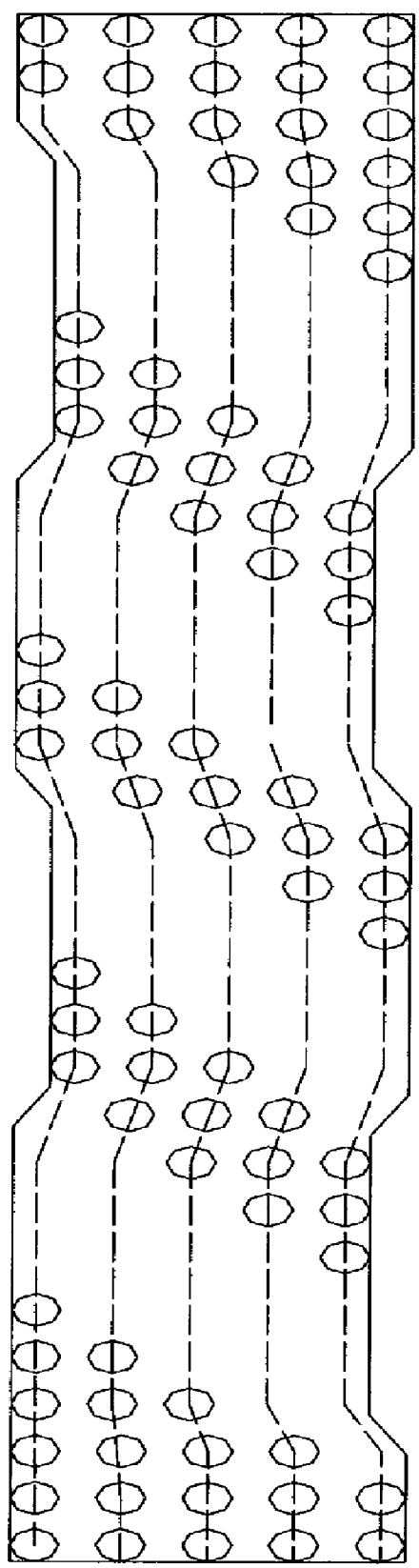
[Fig. 12]

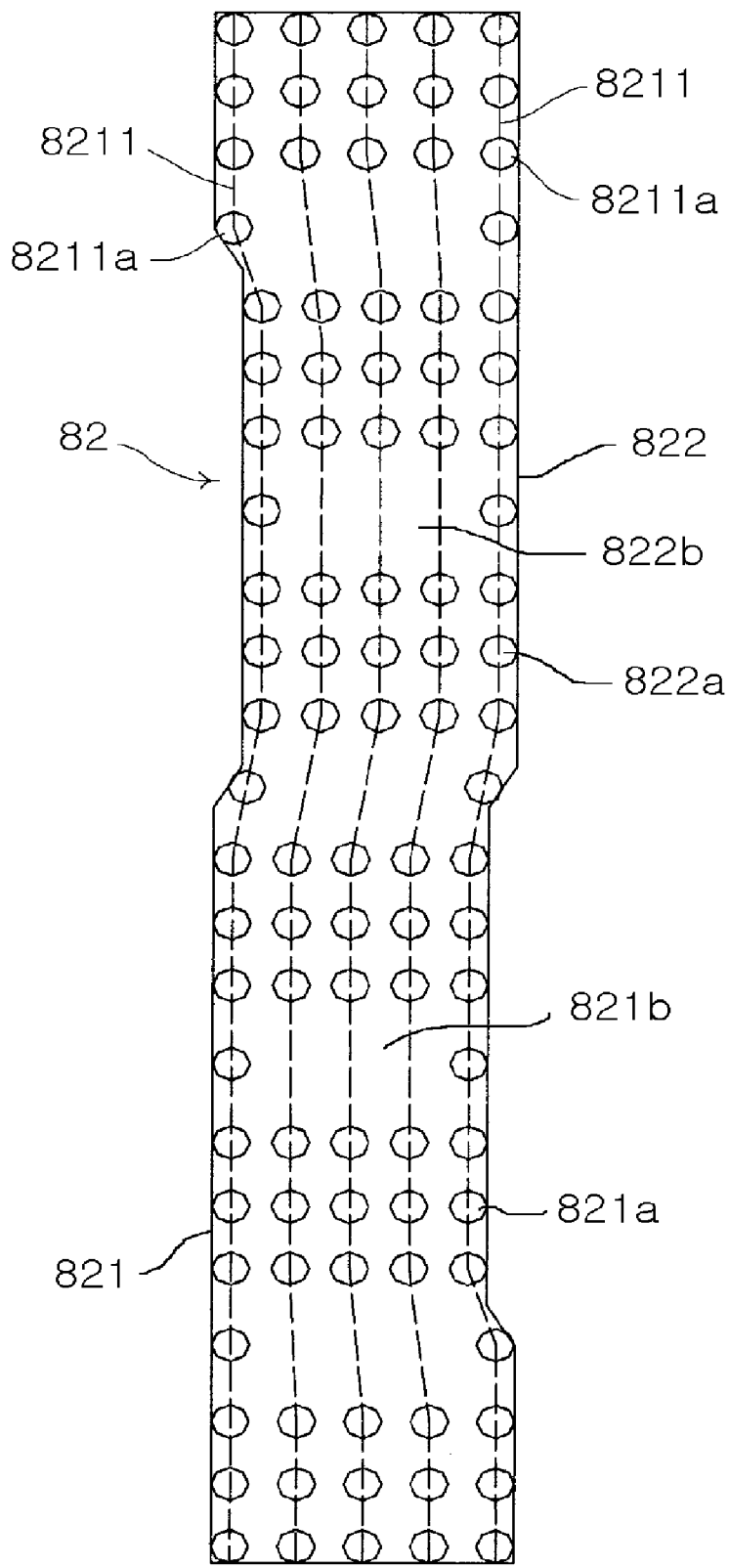
[Fig. 13]

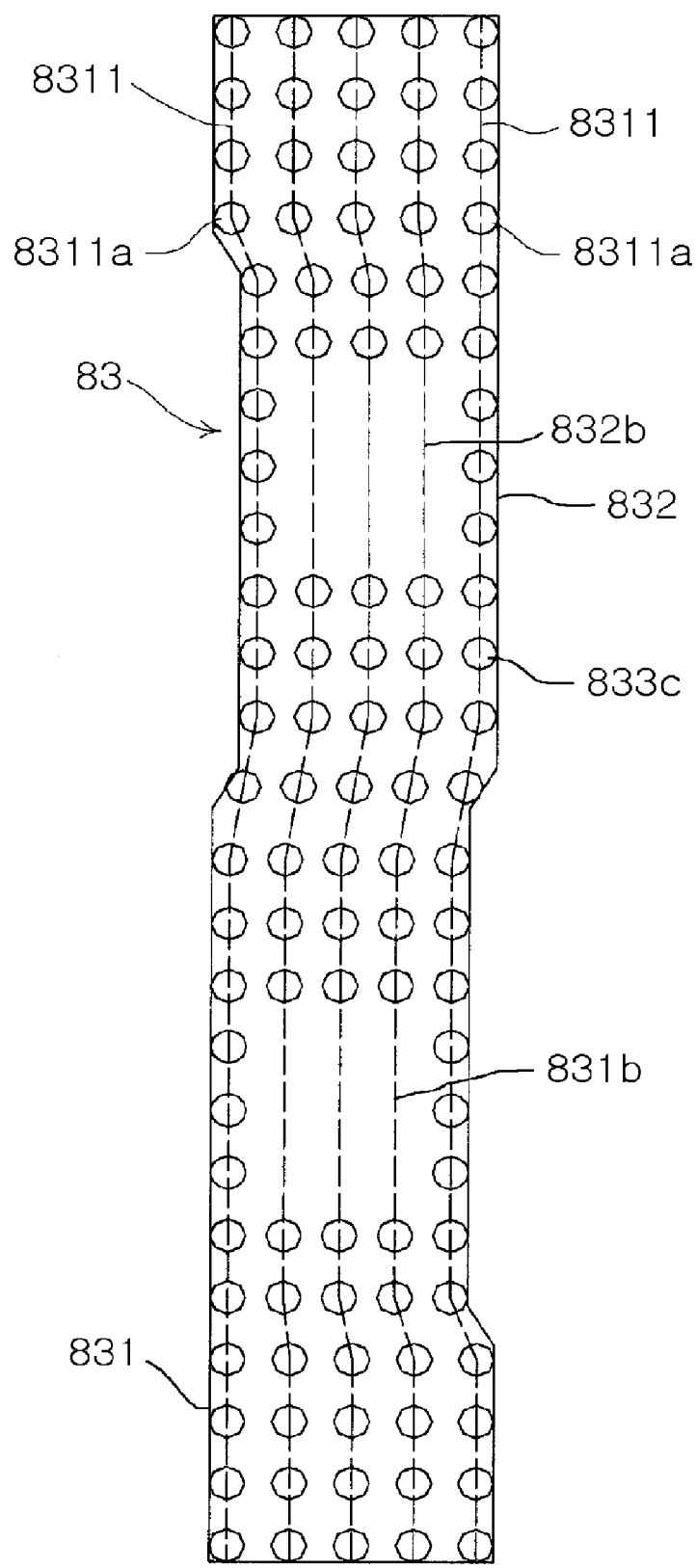
[Fig. 14]

[Fig. 15]
(a)
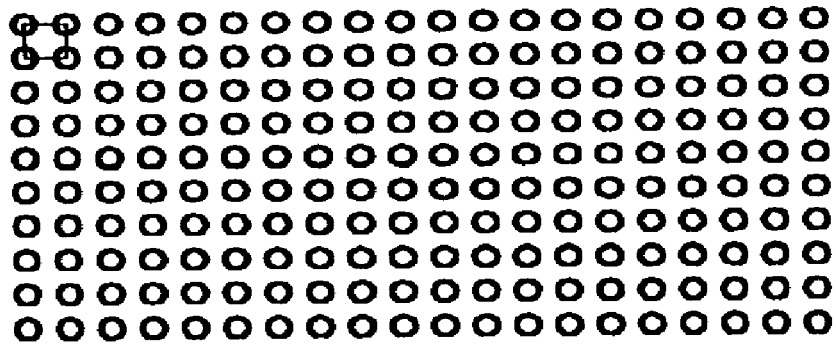
(b)
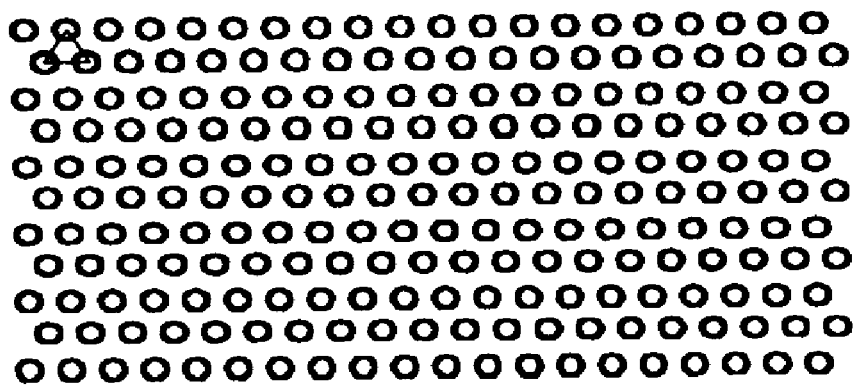
(c)
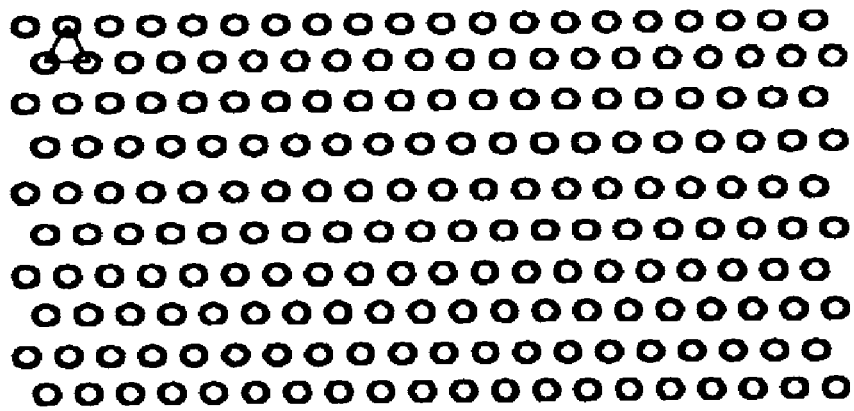

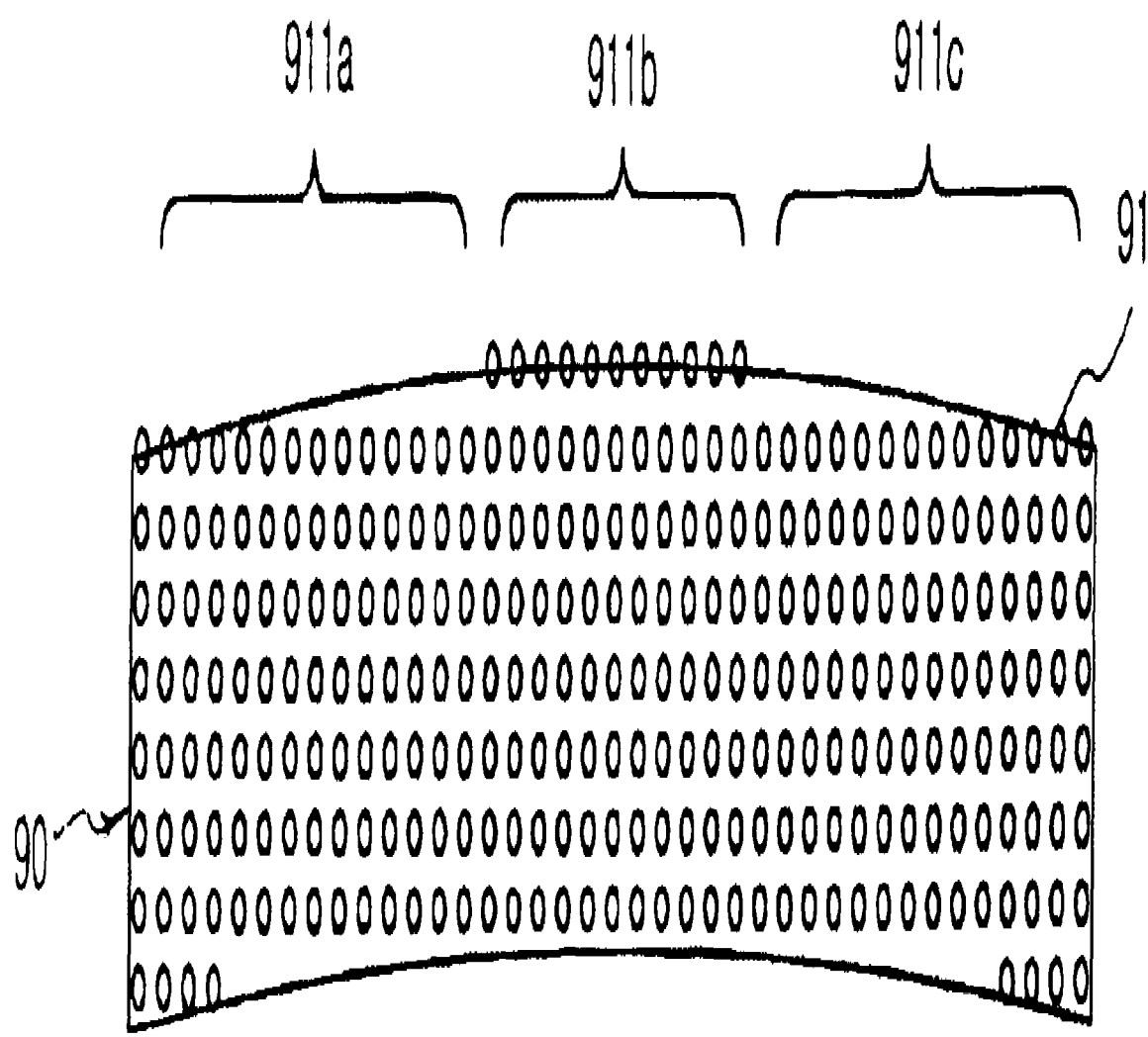
[Fig. 16]

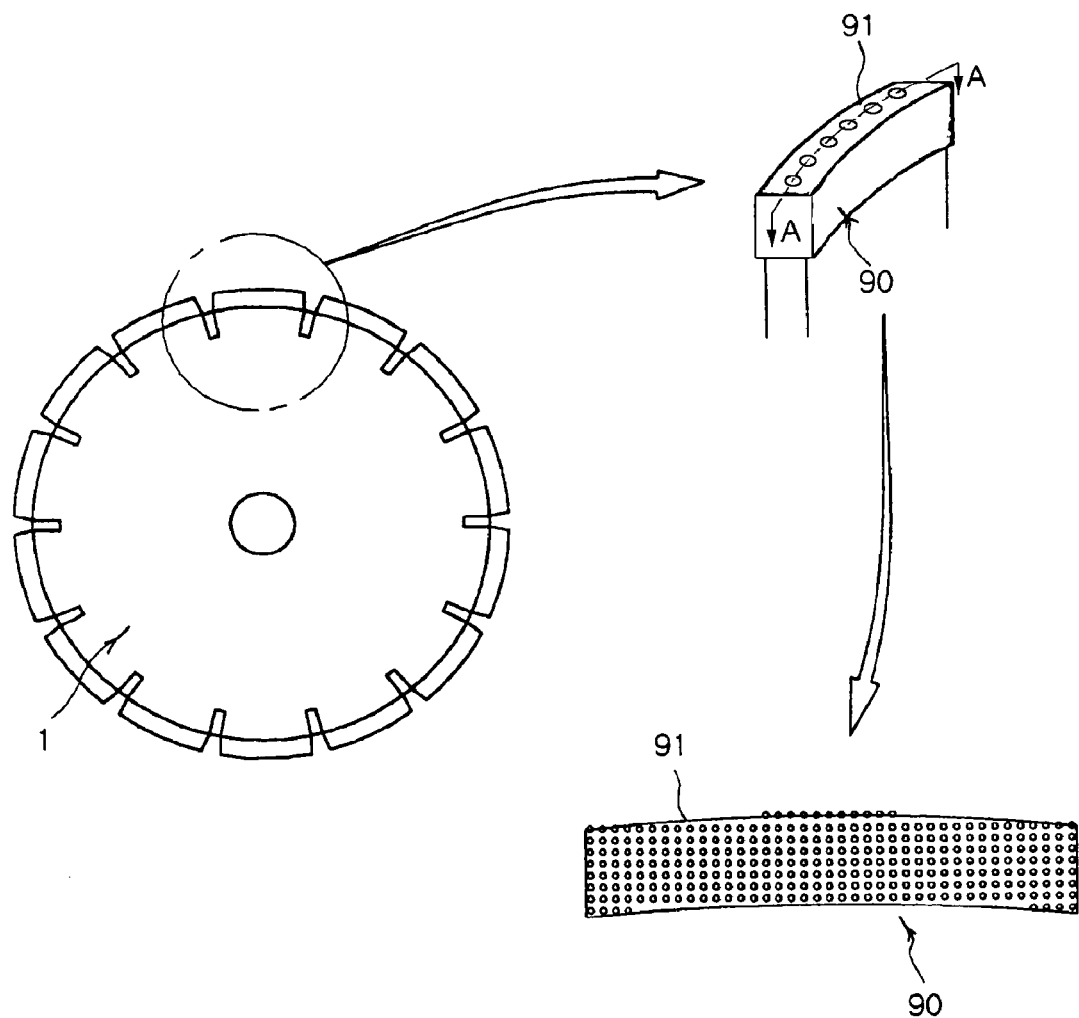
[Fig. 17]

[Fig. 18]
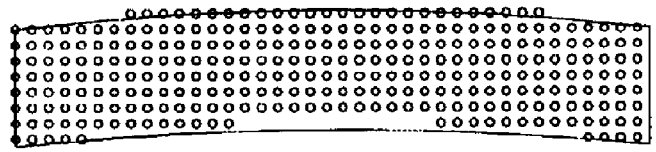
(a)
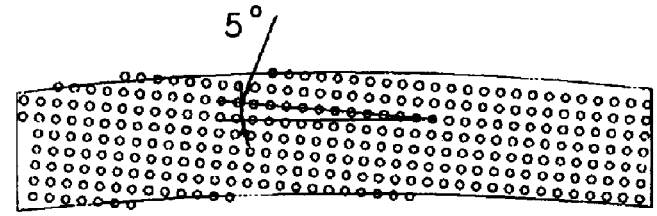
(b)
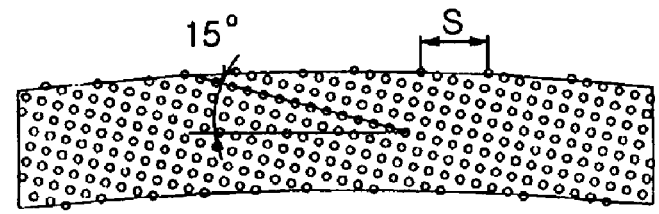
(c)
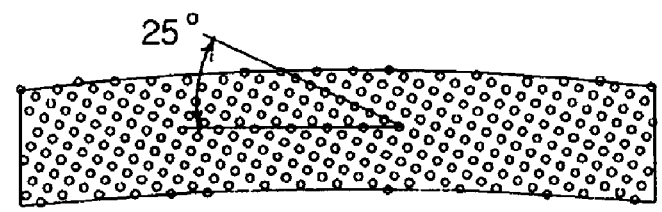
(d)
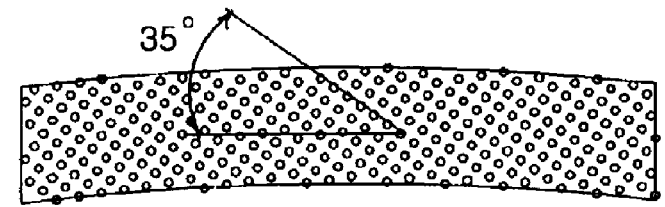
(e)
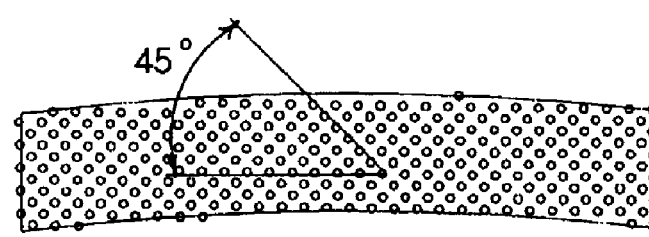
(f)

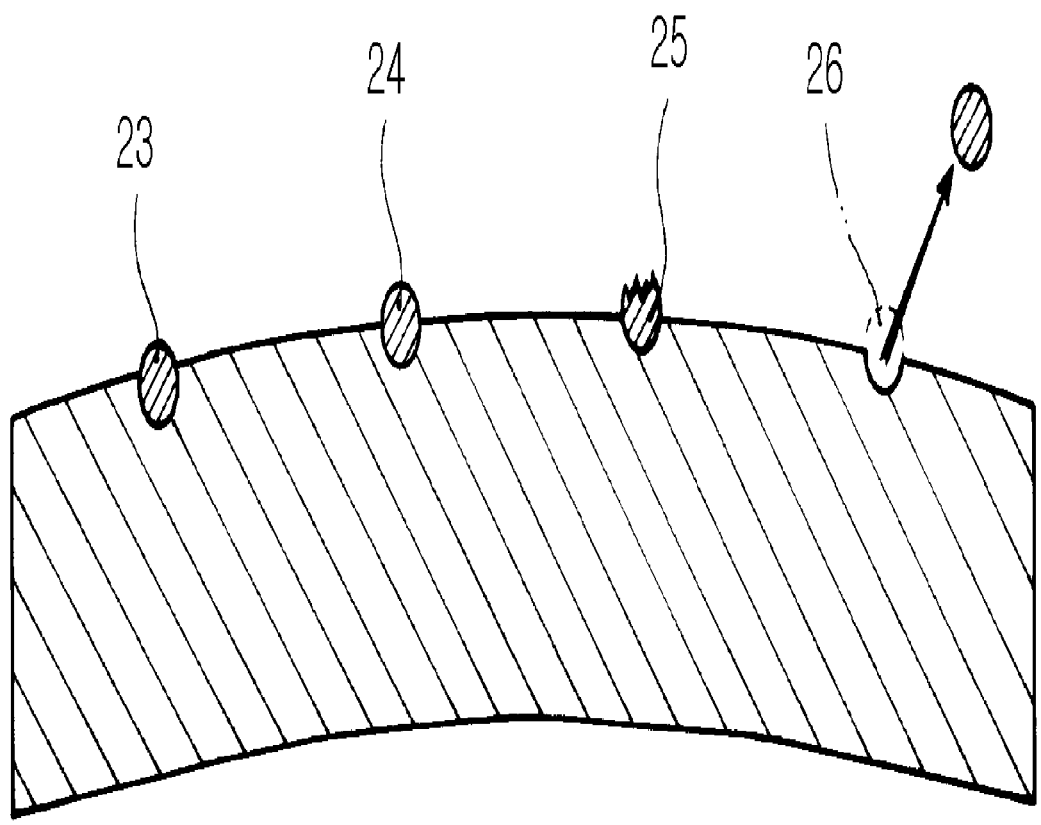
[Fig. 19]

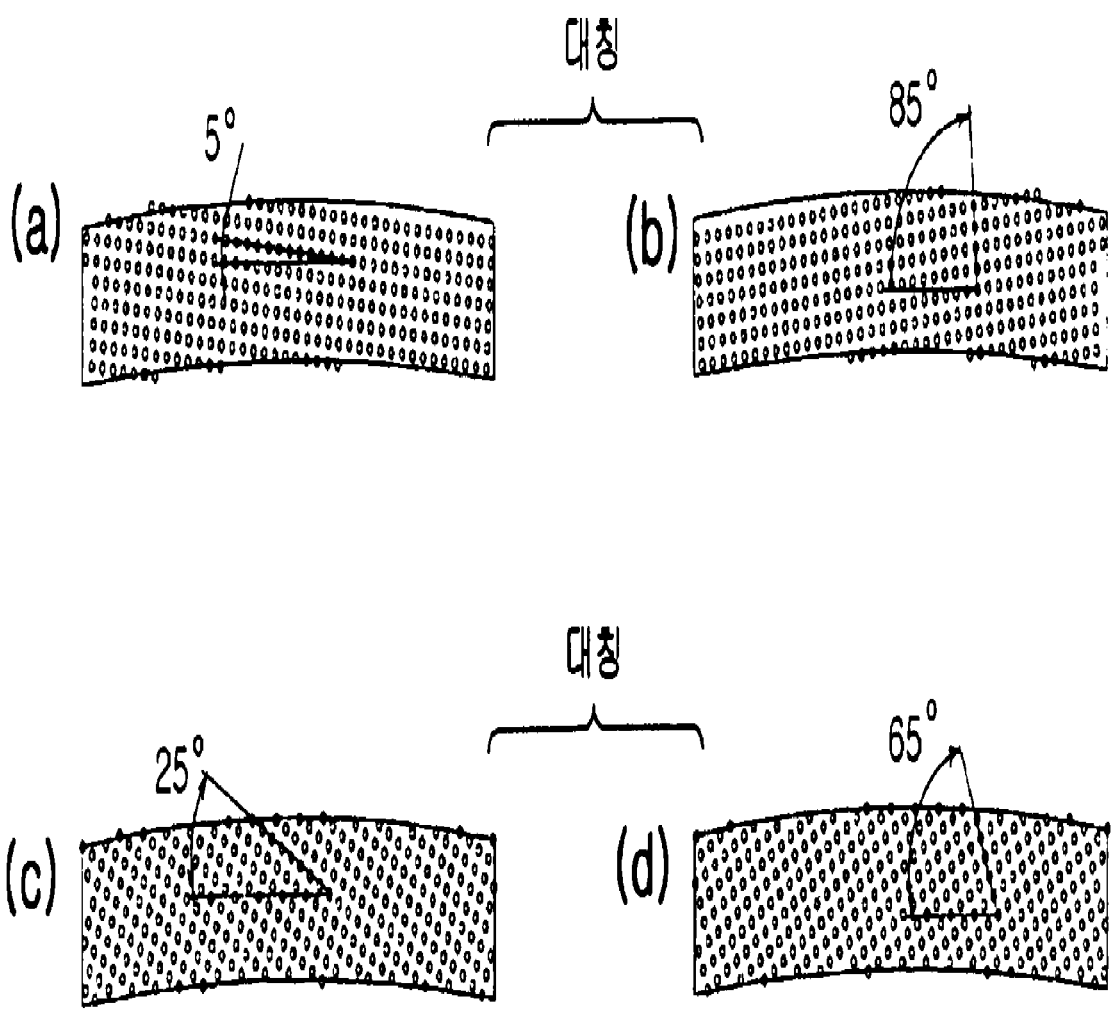
[Fig. 20]

[Fig. 21]
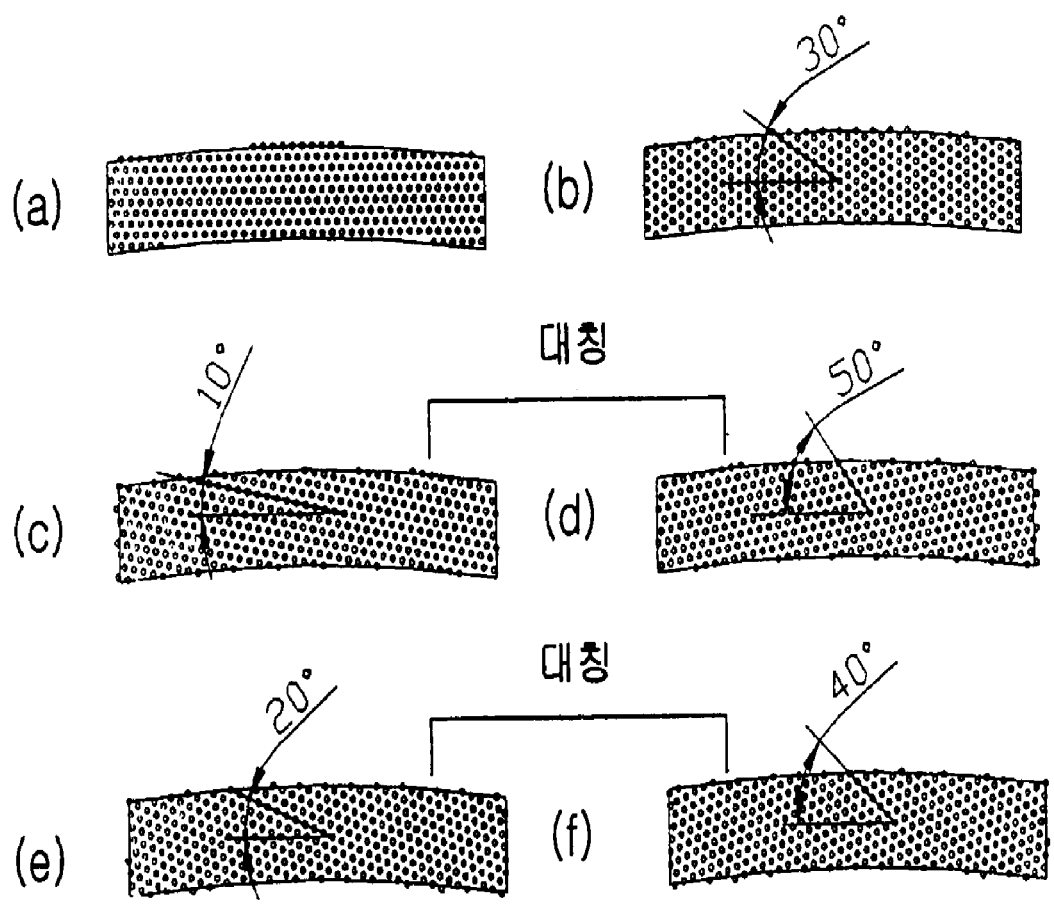

[Fig. 22]
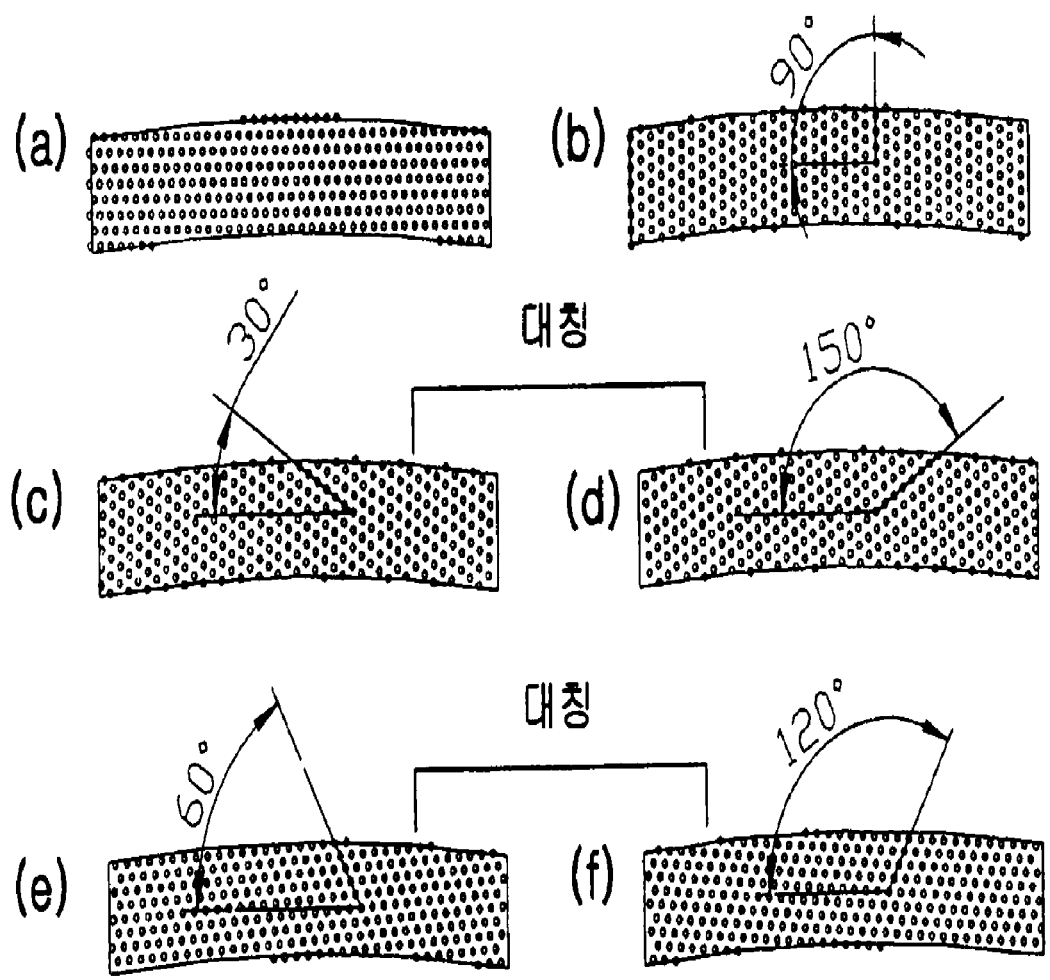

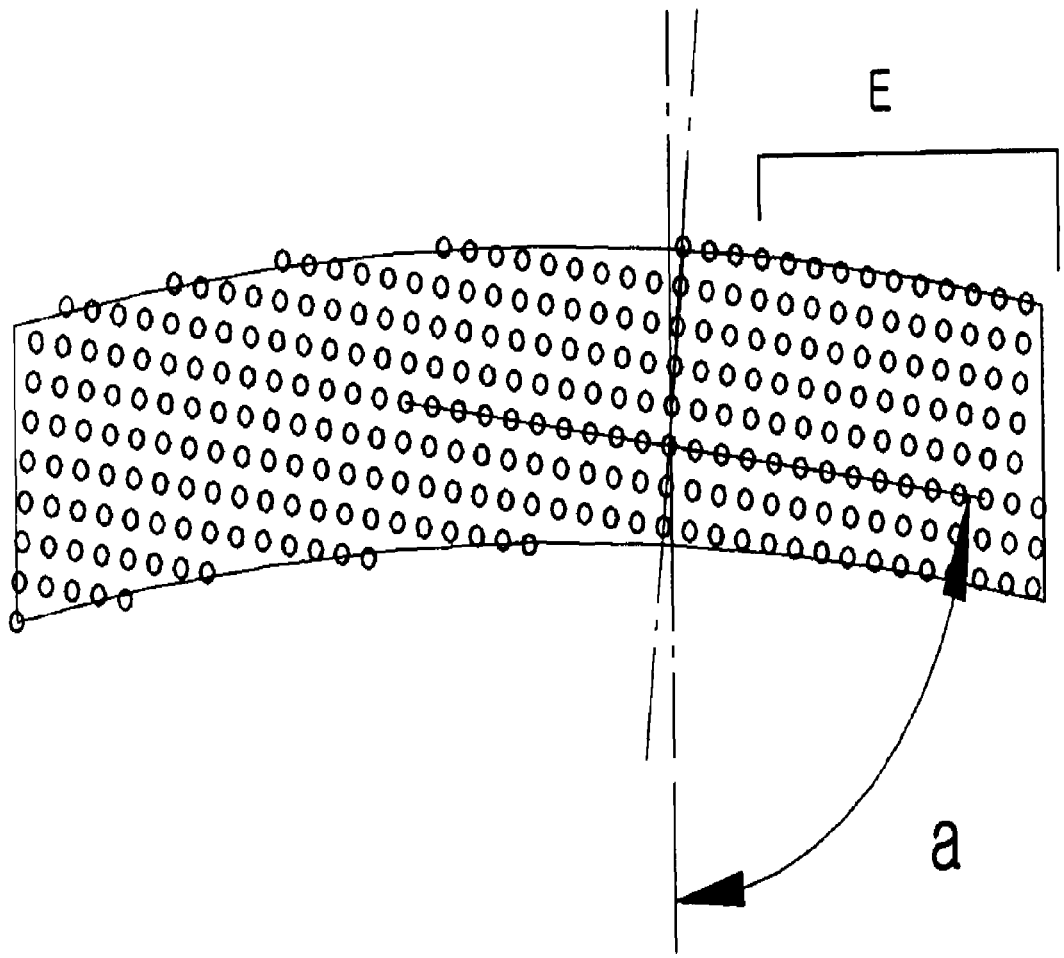
[Fig. 23]

[Fig. 24]
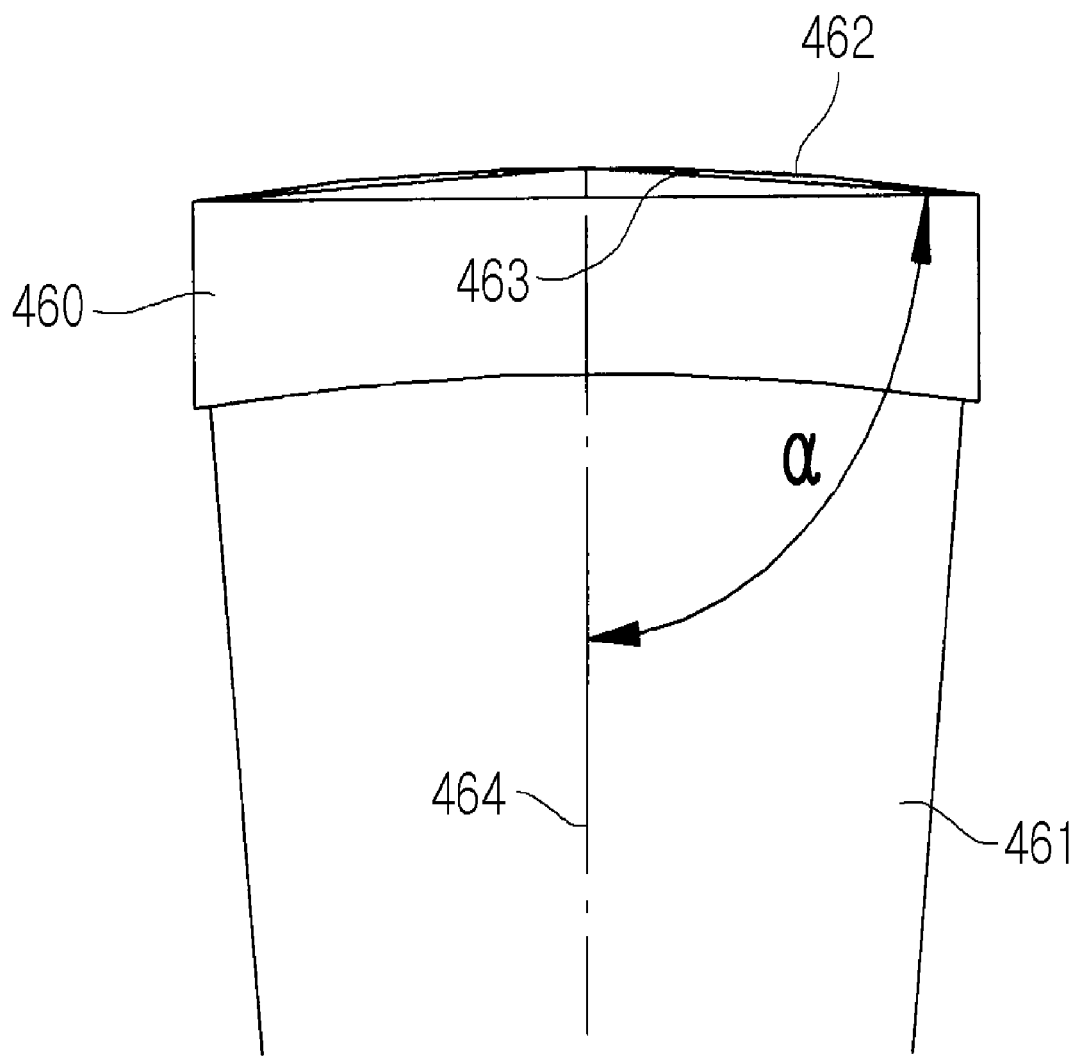

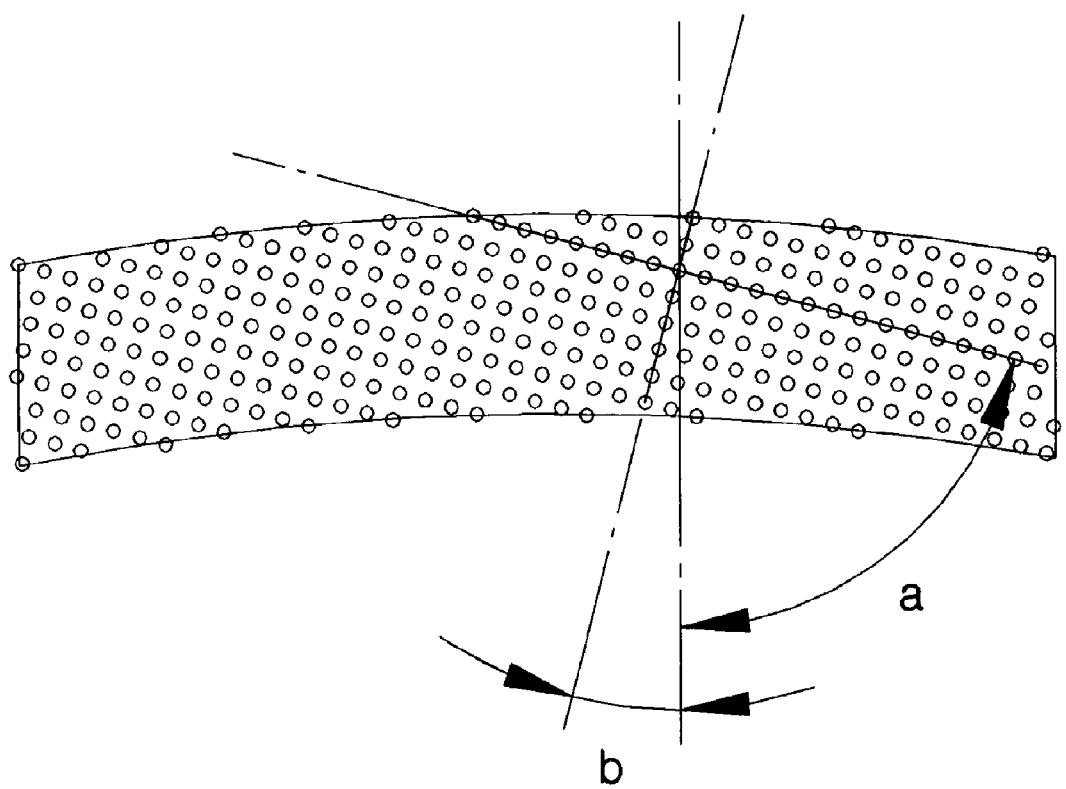
[Fig. 25]

[Fig. 26]
(a) 0° 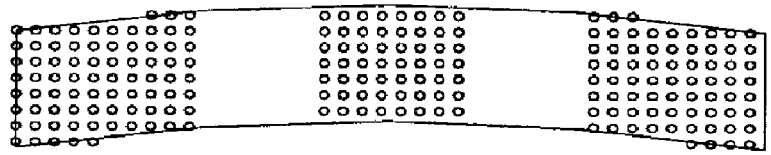
(b) 5° 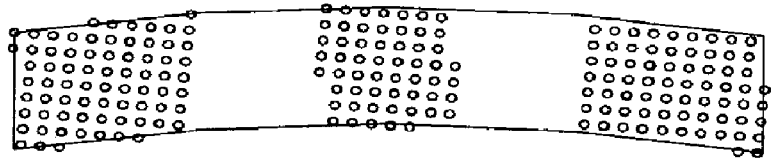
(c) 15° 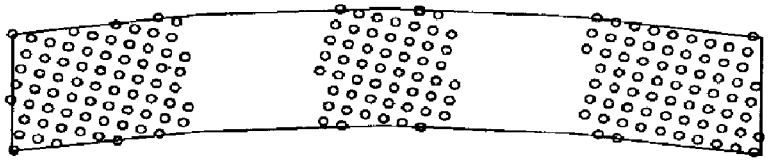
(d) 25° 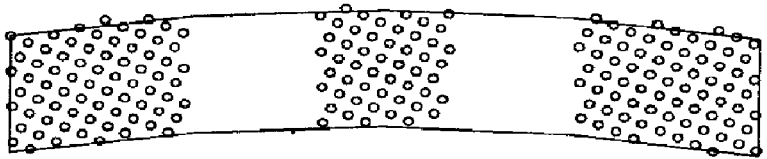
(e) 35° 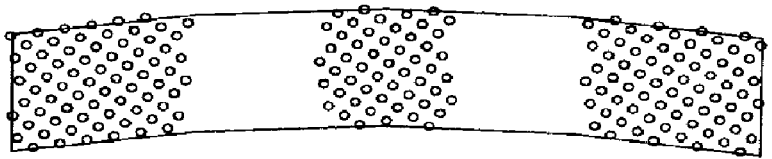
(f) 45° 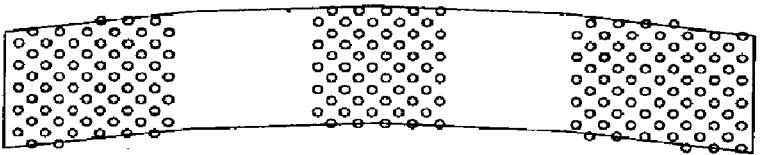

DIAMOND TOOL

This application is a national phase of International Application No. PCT/KR2006/000507 filed Feb. 13, 2006 and published in the English language.

TECHNICAL FIELD

The present invention relates to a diamond tool for cutting or drilling a brittle work piece such as stone, bricks, concrete and asphalt. More particularly, the present invention relates to a diamond tool capable of increasing cutting rate and reducing the amount of fine debris.

The present invention relates to a diamond tool disclosed in Korean Patent Application No. 2001-60680 and No. 2003-55532.

BACKGROUND ART

An artificial diamond (hereinafter referred to as "diamond") was invented in the 1950s. The diamond, which is known to have the highest hardness out of materials in the earth, has been accordingly used for cutting and grinding tools due to such properties.

Especially, the diamond has been broadly used in a stone processing field where stone such as granite and marble is cut and ground, and in a construction field where a concrete structure is cut and ground.

Typically, a diamond tool comprises segments having diamond particles dispersed therein and a metal core having the segments fixed thereto.

FIG. 1 illustrates an example of a segment type diamond tool.

As shown in FIG. 1, the segment type diamond tool 1 includes a plurality of segments 11 and 12 fixed to a disk-shaped metal core 2, each segment 11, 12 having diamond particles 5 randomly dispersed therein.

In cutting a work piece with the diamond tool, each of the diamond particles dispersed in the cutting segments performs cutting.

However, studies and experiments by the inventors have confirmed that in case where the diamond particles are randomly dispersed in the cutting segments, the diamond particles exhibit a lower cutting rate.

That is because the diamond tool having only cutting segments with the diamond particles randomly dispersed therein experiences inefficiencies as follows. First, grooves formed by the diamond particles of a leading segment may be more widely spaced from each other than the size of the diamond particles, thus unable to completely remove lands between the grooves from a work piece even after the diamond particles of a trailing segment pass along the lands. Second, the diamond particles of a trailing segment may pass along the grooves previously formed by the diamond particles of a leading segment so that the diamond particles of the trailing segment do not perform any work.

The segments having the diamond particles randomly dispersed are fabricated via powder metallurgy in which the diamond particles are mixed with metal powder, molded and then sintered.

In case of fabricating the cutting segments by powder metallurgy, the diamond particles are not evenly dispersed owing to differences in particle sizes and specific gravities in mixing, molding and sintering fine diamond particles together with metal powders. Thus as shown in FIG. 1, this disadvantageously leads to a cutting surface 3 having too many diamond particles or a cutting face 4 having too few diamond particles, causing the diamond particles to segregate.

The diamond particles segregated as described above disadvantageously lead to decline in cutting rate of the cutting tool and also useful life thereof.

To overcome such problems of the conventional technique, the inventors have carried out studies and experiments, and based on the results thereof, invented a diamond tool capable of enhancing cutting rate and reducing the amount of fine debris generated during cutting by properly arranging diamond particles in cutting segments of the diamond tool. The diamond tools of such invention are disclosed in Korean Patent Application No. 2001-60680 and No. 2003-55532.

DISCLOSURE OF INVENTION

Technical Problem

The present invention relates to Korean Patent Application No. 2001-60680 and No. 2003-55532. The present invention has been made to solve the foregoing problems of the prior art and it is therefore an object of the present invention to provide a diamond tool capable of improving cutting rate and reducing the amount of fine debris generated during cutting by adequately arranging diamond particles in cutting segments of the diamond tool.

Technical Solution

The present invention will be explained hereunder.

According to an aspect of the invention for realizing the object, there is provided a diamond tool comprising a plurality of cutting segments, wherein each of the segments has a single plate-shaped layer or a plurality of plate-shaped layers of diamond particles arranged therein, wherein the layers of diamond particles are arranged in the cutting segment such that cutting grooves formed on a workpiece by trailing layers of diamond particles are arranged between cutting grooves formed thereon by leading layers of diamond particles, respectively, in cutting of the work piece, wherein the cutting segments each are divided into at least two sections such that n layers of diamond particles are arranged on a leading section in a cutting direction and n' layers of diamond particles are arranged in a trailing section in the cutting direction, where n'≦n, and wherein the layers of diamond particles on the leading section are arranged between the layers of diamond particles in the trailing section, respectively, in the cutting direction, by forming depressed portions at lateral sides of the segment in the cutting direction, wherein the cutting segment has a high-concentration area and a low-concentration area, the high-concentration area showing a concentration higher than an average concentration of the diamond particles, the low concentration area showing a concentration lower than the average concentration, and at least one low concentration area formed on the leading and/or trailing section of the cutting segment.

Advantageous Effects

As described above, according to the invention, depressed portions are formed on a cutting segment so that diamond particle layers of a leading segment are positioned between the diamond particle layers of a trailing segment. Then the diamond particle layers of the trailing segment are grooved near those formed on a work piece by the diamond particle layers of the leading segment during cutting. Advantageously, this enhances a "shoveling" effect and cutting rate of the diamond tool.

Also, a high-concentration area and a low-concentration area are formed on leading and trailing segments, respectively, thereby allowing each of the diamond particles to sustain equal load.

Moreover, according to the invention, the diamond particles are uniformly protruded on a cutting surface of the cutting segment. This maximizes the shoveling effect, thereby boosting the cutting rate and minimizing the amount of fine debris.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates an example of a conventional diamond tool having diamond particles randomly dispersed on the cutting surface of cutting segments;

FIG. 2 illustrates an exemplary cutting segment of the cutting tool;

FIG. 3 illustrates an exemplary depressed cutting segment of the diamond tool;

FIG. 4 illustrates another exemplary depressed cutting segment of the diamond tool;

FIG. 5 illustrates further another exemplary depressed cutting segment of the diamond tool;

FIG. 6 illustrates yet another exemplary depressed cutting segment of the diamond tool;

FIG. 7 illustrates an exemplary depressed cutting segment having diamond particles dispersed therein according to the invention;

FIG. 8 illustrates another exemplary depressed cutting segment having diamond particles dispersed therein according to the invention;

FIG. 9 illustrates further another exemplary depressed cutting segment having diamond particles dispersed therein according to the invention;

FIG. 10 illustrates further another exemplary depressed cutting segment having diamond particles dispersed therein according to the invention;

FIG. 11 illustrates further another exemplary depressed cutting segment having diamond particles dispersed therein according to the invention;

FIG. 12 illustrates further another exemplary depressed cutting segment having diamond particles dispersed therein according to the invention;

FIG. 13 illustrates further another exemplary depressed cutting segment having diamond particles dispersed therein according to the invention;

FIG. 14 illustrates yet another exemplary depressed cutting segment having diamond particles dispersed therein according to the invention;

FIG. 15 is a schematic view illustrating examples of diamond particles arranged on a surface cut perpendicular to a cutting surface of a cutting segment of a diamond tool; in which FIG. 15(a) illustrates an example of diamond particles arranged in a regular square unit structure, FIG. 15(b) illustrates an example of diamond particles arranged in an equilateral triangle unit structure, and FIG. 15(c) illustrates an example of diamond particles arranged in an isosceles triangle unit structure;

FIG. 16 is a schematic view illustrating an example of diamond particles arranged in a regular square unit structure as in FIG. 15(a);

FIG. 17 illustrates an exemplary structure of diamond particles arranged on a plane cut perpendicular to a cutting surface of a cutting segment of the diamond tool;

FIG. 18 is a schematic view illustrating exemplary arrays of diamond particles arranged in a regular square unit structure and at predetermined tilt angles;

FIG. 19 illustrates an exemplary cutting surface of a cutting segment in which diamond particles arranged on the cutting surface of the cutting segment of the diamond tool are exposed on the cutting surface during cutting.

FIG. 20 is a schematic view illustrating diamond particles arranged in a regular square unit structure and at a tilt angle of 5° and 25°;

FIG. 21 is a schematic view illustrating exemplary arrays of diamond particles arranged in a regular square unit structure and at predetermined tilt angles;

FIG. 22 is a schematic view illustrating exemplary arrays of diamond particles arranged in an isosceles triangle unit structure and at predetermined tilt angles;

FIG. 23 is a schematic view illustrating diamond particles arranged densely at a rear end portion of a cutting segment due to a small tilt angle in case where the diamond particles are arranged in a straight line;

FIG. 24 is a schematic view illustrating a portion of a diamond tool having a cutting segment attached to a steel core;

FIG. 25 is a schematic view illustrating a cutting segment in which angles a and b of diamond particles arranged are defined; and FIG. 26 illustrates exemplary arrays of diamond particles arranged on a plane cut perpendicular to a cutting surface of a cutting segment of a diamond tool according to the invention.

MODE FOR THE INVENTION

The present invention will be explained in detail hereunder.

The present invention relates to a diamond tool which ensures most effective use of each diamond particle by properly arranging diamond particles on a cutting surface contacting a work piece during cutting.

The invention is preferably employed in a diamond tool comprising a plurality of cutting segments, wherein each of the segments has a single plate-shaped layer or a plurality of plate-shaped layers of diamond particles arranged therein, wherein the layers of diamond particles are arranged in the cutting segment such that cutting grooves formed on a workpiece by trailing layers of diamond particles are arranged between cutting grooves formed thereon by leading layers of diamond particles, respectively, in cutting of the work piece, wherein the cutting segments each are divided into at least two sections such that n layers of diamond particles are arranged in a leading section in a cutting direction and n' layers of diamond particles are arranged in a trailing section in the cutting direction, where n'≦n, and wherein the layers of diamond particles in the leading section are arranged between the layers of diamond particles in the trailing section, respectively, in the cutting direction, by forming depressed portions at lateral sides of the segment in the cutting direction, wherein the cutting segment has a high-concentration area and a low-concentration area, the high-concentration area showing a concentration higher than an average concentration of the diamond particles, the low concentration area showing a concentration lower than the average concentration, and at least one low concentration area formed on the leading and/or trailing section of the cutting segment.

Preferably, the depressed portions are formed on one or both lateral sides of the cutting segment.

Preferably, at least one of the depressed portions is formed on each lateral side of the cutting segment.

The low-concentration area may be parallel or tilted in a direction perpendicular to the cutting direction.

The high-concentration area may be formed across the leading and trailing sections of the cutting segment.

Further, the layers of diamond particles positioned on at least one lateral side of the cutting segment have diamond particles uniformly spaced from each other.

The present invention will be explained in greater detail with reference to the accompanying drawings.

FIG. 2 shows a cutting segment 141 divided into 2 sections in a cutting direction where three layers of diamond particles are arranged in a leading section and two layers of diamond particles are arranged in a trailing section in a cutting direction.

As shown in FIG. 2, diamond particle layers 141$d$ and 141$e$ in the trailing section are arranged between diamond particle layers 141$a$, 141$b$ and 141$c$ in the leading section.

FIG. 3 shows a cutting segment 21 in which depressed portions are formed alternately at lateral sides of a leading section 211 and a trailing section 212.

As shown in FIG. 3, three diamond particle layers 211$a$, 211$b$ and 211$c$ are arranged in the leading section 211 and three diamond particle layers 212$a$, 212$b$ and 212$c$ are arranged in the trailing section 212. Also, the three diamond particle layers 211$a$, 211$b$ and 211$c$ in the leading section 211 are arranged between the three diamond particle layers 212$a$, 212$b$ and 212$c$ in the trailing section 212.

Further, referring to FIG. 4, a plurality of depressed portions are formed alternately at lateral sides of the cutting segment 22 in the cutting direction. The depressed portions are repeatedly formed so that there are at least two parts where diamond particle layers are arranged between those in a trailing section.

As shown in FIG. 4, the leading section 221 and the trailing section 222 of a cutting segment 22 include a leading sub-section 2211 and 2221 and a trailing sub-section 2212 and 2222, respectively. Three diamond particle layers 221$a$, 221$b$ and 221$c$ are arranged in the leading sub-section 2211 of the leading section 221, and three diamond particle layers 221$d$, 221$e$ and 221$f$ are arranged in the trailing sub-section 2212 of the leading section 221. Likewise, three diamond particle layers 221$g$, 221$h$ and 221$i$ are arranged in the leading sub-section 2221 of the trailing section 222, and three diamond particle layers 221$j$, 221$k$ and 221$l$ are arranged in the trailing sub-section 2222 of the trailing section 222. Herein, the three diamond particle layers 221$a$, 221$b$ and 221$c$ are arranged between the three diamond particle layers 221$d$, 221$e$ and 221$f$, respectively, while the three diamond particle layers 221$g$, 221$h$ and 221$i$ are arranged between the three diamond particle layers 221$j$, 221$k$ and 221$l$, respectively.

FIGS. 5 and 6 illustrate exemplary cutting segments having diamond particles some of which are arranged to contact lateral sides.

The depth, length and number of the depressed portions may vary appropriately depending on the concentration and size of diamond particles.

In the cutting segments, in case where the leading and trailing sections are long, or the diamond particle layers are highly concentrated, the diamond particles therein may not play their role properly.

That is, in the diamond particle layers 212$a$, 212$b$ and 212$c$ of FIG. 3, the diamond particles 2121 to 2123 of the leading segment in a cutting direction sustain bigger load than the diamond particles 2124 to 2126 of the trailing segment. This causes the diamond particles 2121 to 2123 of the leading segment to crack severely or fall off while the diamond particles 2124 to 2126 of the trailing segment sustain relatively less load, potentially suffering polishing.

Exemplary cutting segments of the invention are shown in FIGS. 7 to 14.

As shown in FIG. 7, according to the invention, to overcome problems as described above, a cutting segment 80 has high-concentration areas 801$a$ and 802$a$ and low-concentration areas 801$b$ and 802$b$. The high concentration area shows a concentration higher than an average concentration of the diamond particles whereas the low concentration area shows a concentration lower than the average concentration. Also, at least one low-concentration area 801$b$ and/or 802$b$ is formed in a leading section 801 and/or a trailing section 802.

A depressed portion 801$d$, 80$rd$ is formed at each lateral side of the cutting segment 80.

The low-concentration areas 801$b$ and 802$b$ are parallel in a direction perpendicular to the cutting direction.

FIG. 8 shows a cutting segment in which high-concentration and low-concentration areas are formed as in FIG. 7 and two depressed portions are formed at each lateral side.

Referring to FIG. 9, a cutting segment 81 has a high concentration area 813$c$ and low-concentration areas 811$b$ and 812$b$. But the high concentration area 813$c$ is formed across a leading section 811 and a trailing section 812 of the cutting segment. Also, a depressed portion 811$d$, 81$rd$ is formed on each lateral side.

The low-concentration areas 811$b$ and 812$b$ are parallel in a direction perpendicular to a cutting direction.

FIG. 10 shows a segment in which a high concentration area and a low-concentration area are formed as in FIG. 9, and in which also two depressed portions are formed at each lateral side.

Referring to FIG. 11, a segment 84 has high-concentration area 843$c$ and low-concentration areas 841$b$ and 842$b$. The high-concentration area 843$c$ is formed across a leading section 841 and a trailing section 842 of the cutting segment. Also, a depressed portion 841$d$, 84$rd$ is formed on each lateral side. The low-concentration areas are tilted in a direction perpendicular to the cutting direction.

FIG. 12 shows a cutting segment having high-concentration areas and low-concentration areas as in FIG. 11, in which two depressed portions are formed on each lateral side.

Referring to FIG. 13, a cutting segment 82 has high-concentration areas 821$a$ and 822$a$ and low-concentration areas 821$b$ and 822$b$ in a leading section 821 and a trailing section 822. Layers 8211 of diamond particles 8211$a$ positioned on at least one lateral side of the cutting segment has diamond particles uniformly spaced from each other. In addition, a depressed portion is formed on each lateral side of the cutting segment 82.

Referring to FIG. 14, in a cutting segment 83, layers 8311 of diamond particles 8311$a$ positioned on at least one lateral side of the cutting segment have diamond particles uniformly spaced from each other. Also, a depressed portion is formed on each lateral side as in FIG. 13. However, the cutting segment 83 has low-concentration areas 831$b$ and 832$b$ in a leading segment 831 and a trailing segment 832. The high-concentration area 833$c$ is formed across the leading and trailing segments 831, 832.

The cutting segments shown in FIGS. 7 to 14 may have no diamond particles in the low-concentration area.

In the diamond tool having diamond particles arranged as described above according to the invention, to maximize the shoveling effect, preferably, diamond particles are arranged at a predetermined tilt angle (hereinafter, "tilt angle") with respect to a line connecting upper vertices or a line connecting lower vertices of a cross section, cut parallel in a cutting direction and perpendicular to a cutting surface so that the diamond particles are protruded and uniformly spaced from each other on the cutting surface of the segment in cutting of the work piece. An explanation thereof will be given in greater detail hereunder.

A diamond tool of the invention can be fabricated by power metallurgy in which diamond particles are mixed with metal powder, molded and then sintered.

In molding metal powder to fabricate a cutting segment via the power metallurgy, diamond particles are arranged in a plate-shaped structure inside the cutting segment. FIG. 15 shows examples of the diamond particles arranged.

As shown in FIG. 15, the diamond particles may be arranged in a regular square unit structure [FIG. 15(a)], an equilateral triangle unit structure [FIG. 15(b)], and an isosceles triangle unit structure [FIG. 15(c)].

However, the unit structure of the diamond particle arrangement is not limited thereto.

In case where the diamond particles are arranged in a regular square unit structure as in FIG. 15(a), the diamond particles in the cutting segment are arranged as shown in FIG. 16.

That is, the diamond particle arrangement shown in FIG. 16 is a section of the cutting segment cut along the line A-A of FIG. 17.

The term used herein, that is, "a section taken perpendicular to the cutting surface along the cutting direction" means a section of the cutting segment taken along the line A-A as in FIG. 17.

Reference numeral 91 in FIG. 17 denotes a cutting surface.

Referring to FIG. 16, based on an observation of diamond particles on a cutting surface 91 of a cutting segment 90 where cutting is performed, diamond particles 911b in a central portion engage in cutting at an early stage but then with these diamond particles 911b falling off, diamond particles 911a and 911c in leading and trailing portions start to perform cutting in turn.

Such process is repeated continually during cutting. Consequently this prevents diamond particles from protruding uniformly from across a cutting surface of a cutting segment, causing them to be dense in some areas. Therefore, the shoveling effect can not be achieved 100%.

As a result, it is effective to arrange the diamond particles at a predetermined tilt angle.

FIG. 18 shows diamond particles arranged in a regular square unit structure and at a predetermined tilt angle.

As can be seen from FIG. 18, diamond particle arrangements of FIG. 18(b) to (f) exhibit more proper distances S between the diamond particles on the cutting surface than in FIG. 18(a).

Typically, in case of a diamond saw blade, as in FIG. 19, diamond particles are arranged on a cutting surface during cutting in various types such as an emerging crystal 23, a whole crystal 24, a fractured crystal 25, and a pulled-out hole 26.

According to a document pertinent to diamond tools, cutting is most efficiently performed when the ratio among whole crystal, fractured crystal and pull-out hole is 4:4:2.

Therefore, if the diamond particles of the cutting segment are arranged preferably at a predetermined tilt angle, more preferably at 5° or more, whole crystals, fractured crystals and pulled-out holes can be adequately associated. This improves efficiency of cutting.

In case where a regular square is taken as the unit structure as shown in FIG. 18, the diamond particles are symmetrically arranged with respect to a tilt angle of 45°.

That is, FIG. 20 (a) is symmetrical to FIG. 20 (b), and FIG. 20 (c) is symmetrical to FIG. 20 (d).

In case an equilateral triangle and isosceles triangle are taken as the unit structure as shown in FIG. 21, the diamond particles are symmetrically arranged with respect to tilt angles of 30° and 90°, respectively.

FIGS. 21 and 22 show arrangement and symmetrical configuration of diamond particles in case where the diamond particles are arranged in an equilateral triangle and an isosceles triangle.

In case where the diamond particles have narrow inter-particle distance and an almost same height as in FIG. 16, the cutting may partially expose a region in the cutting surface where the diamond particles have a narrow inter-particle distance. Then, the shoveling effect may not be realized 100% and thus excellent cutting rate cannot be expected.

Owing to a definite radius of an actual cutting surface of a cutting segment, if diamond particles are arranged on a straight line, the diamond particles can be densely arranged in a distal portion of the cutting surface in the cutting segment at a small tilt angle as indicated with E in FIG. 19.

FIG. 24 shows a portion of a diamond tool in which a cutting segment is attached to a steel core.

In FIG. 24, a straight line 463 is drawn from the center of a cutting surface 462 of a cutting segment 460 to leading and trailing edges of the cutting segment 460, and a straight line 464 is drawn from the center of the cutting surface 462 to the center of the steel core 461. The straight line 463 defines an angle α from the straight line 464, wherein it is supposed that the straight line 463 is in the cutting surface 462.

Since diamond particles which actually take part in the cutting are on the cutting surface 462, the angle α is preferably not equal to an angle a or b which is defined as in FIG. 25.

That is, when the diamond particles are arranged, tilt angle is preferably set in such a range that α is not equal to a or b because the angle α can be varied according to the outer diameter dimension of the steel core 461 and the length of the cutting segment 460.

In case where the angle α is equal to angle a or b as shown in FIG. 23, the inter-particle distance is narrowed in the cutting surface and thus the diamond particles are protruded only in the limited region E. As a result, the shoveling effect cannot be obtained 100%.

As such, according to the invention, in order to enhance the shoveling effect, the diamond particles are arranged at a predetermined tilt angle with respect to a line connecting upper vertices or a line connecting lower vertices of a cross section, cut perpendicular to a cutting surface along the cutting direction. That is, the diamond particles are arranged such that the angle α defined as in FIG. 24 is not equal to an angle a or b which is defined as in FIG. 25.

The diamond particle arrangement as described above allows the diamond particles to be exposed at uniform spaces on the cutting surface in cutting, thereby enhancing the shoveling effect further and resultantly increasing efficiency of cutting more.

The technical principle as stated above may be applied to the invention.

FIG. 26 shows examples of diamond particles arranged on a cutting segment in case where the cutting segment of the invention is cut as in FIG. 17.

Referring to FIG. 26, preferably to form a high-concentration area and a low-concentration area on leading and trailing sections of the cutting surface, the diamond particles are arranged at a predetermined tilt angle as shown in FIG. 18 in such a fashion that the diamond particles are disposed in the high-concentration area but not in the low-concentration area.

At this time, the diamond particles in the high-concentration area are more narrowly spaced from each other by arranging the same number of diamond particles in the cutting segment as that in FIG. 18.

As such, according to the invention, as shown in FIG. 26, the diamond particles are arranged at a predetermined tilt angle with respect to a line connecting upper vertices or a line connecting lower vertices of a cross section, cut perpendicular to a cutting surface along the cutting direction so that preferably the diamond particles are protruded and uniformly spaced from each other on the cutting surface of the segment in cutting of the work piece.

FIG. 26 shows exemplary arrays of diamond particles arranged in a square unit structure. But the invention is not limited thereto and the diamond particles may be arranged in a regular square or isosceles triangle unit structure.

Furthermore, the invention may be applied to core bits including a plurality of cutting segments.

In addition, the invention may be applied to a diamond tool including some segments having the diamond particles randomly dispersed therein.

In this case, cutting efficiency is superior to that of a conventional diamond tool but somewhat inferior to that of a diamond tool having no segments with the diamond particles randomly dispersed therein.

Further, according to the invention, in order to prevent premature abrasion of the cutting segment, high wear-resistant fillers are dispersed properly in the cutting segment.

According to the invention, to further prolong lifetime of the cutting tool, fillers (abrasive with high hardness) are added into a metal binder to increase wear resistance of the metal binder.

Available materials for fillers may include wear-resistant particles such as SiC, WC, BN, $Al_2O_3$ and diamond, and composites thereof.

In case where diamond is selected as fillers, diamond particles added as fillers should have a concentration lower than that of diamond particles added for cutting since the fillers are added only to prevent abrasion of the cutting segment.

Preferably, the concentration of the filler diamond particles added is about 10 to 60% of that of the cutting diamond particles.

Preferably, the fillers are dispersed on lateral sides of the cutting segment.

An example of fabricating a diamond tool of the invention will now be explained hereunder.

A spray-type adhesive is coated onto a metal net cut in the shape of a cutting segment. Then a metal jig uniformly perforated by a laser is placed on the metal net, and fine diamond particles are spread thereto. At this time, one diamond particle is placed in one hole of the metal jig. With separation of the metal jig, a metal net having diamond particles uniformly arranged is obtained. The metal net is cold-formed with metal binder, and then sintered to fabricate a cutting segment.

At this time, in case of fabricating the cutting segment by dividing it into at least two areas, upper and lower mold having a relief or embossment may be used during forming or sintering, but sintering is more preferable, and widely used in the diamond tool industry. The aforesaid method for fabricating the diamond tool of the invention is just one preferable example and the invention is not limited thereto.

An explanation will be given about a cutting mechanism in cutting a work piece via a diamond tool.

As shown in FIG. 7, the depressed portions are formed at lateral sides of the segment 80 so that the layers of diamond particles of the leading section 801 are arranged between the layers of diamond particles of the trailing section 802. Then the layers of diamond particles of the leading sections are grooved in an area adjoining the grooves formed on the work piece by the layers of diamond particles of the leading section during cutting. This enhances the shoveling effect and cutting rate of the diamond tool. Also, the work piece can be cut into larger debris, thereby minimizing the amount of fine debris generated during cutting.

In addition, a high-concentration area and a low-concentration area are formed on the leading and trailing sections of cutting segments, respectively. This allows each of the diamond particles to sustain equal load during cutting. Further, the diamond particles are arranged such that an angle α defined in FIG. 24 is not the same as an angle a or b defined in FIG. 25. Consequently this enables the diamond particles to be exposed on the cutting surface at uniform intervals in cutting the work piece, thereby improving the shoveling effect further and resultantly cutting rate.

The invention will be explained in greater detail through a following example.

EXAMPLE 1

Saw blades for Comparative Example, Inventive Example and Conventional Example were fabricated, respectively, under the conditions set forth in Table 1 below. In the saw blade of Comparative Example, a cutting segment had three layers of diamond particles arranged uniformly therein as in FIG. 5 in which diamond fillers of the same type and size were disposed. Also, depressed portions were formed alternately on lateral sides of the cutting segment. In the saw blade of Inventive Example, a cutting segment had a high concentration area and a low-concentration area (diamond particles absent) according to the invention as in FIG. 7. In the saw blade of Conventional Example, diamond particles were not uniformly arranged but randomly dispersed therein. Then a cutting test on the saw blades was conducted to examine cutting rate and useful life, and the results are shown in Table 1.

In Comparative Example and Inventive Example, the layers of diamond particles were uniformly arranged in a direction perpendicular to a cutting surface at a tilt angle of 25°.

At this time, the layers of diamond particles were arranged in a thickness of 0.4 mm, i.e. an average diamond particle size, and spaced from each other by a distance of 0.3 mm.

Co—Fe—Ni-based alloy was used for a metal binder and diamond particles used were MBS 955 available from GE of U.S. Sintering was performed via hot press method at a temperature of 860° C. and during a period of 5 minutes.

The cutting segment fabricated as above was attached to a 14-inch core by laser welding and work pieces of concrete were cut with 35 mm of depth.

A machine used was an engine-driven cutting machine available from EDCO Corp.

To prevent abrasion, diamond particles identical to those uniformly arranged in the central portions were arranged in the lateral portions of the cutting segment. Diamond particles used as fillers had a concentration that was 30% of the concentration of the diamond particles arranged in the central portions.

TABLE 1

| Sample No. | Concentration (cts/cc) | Cutting index (cm²/min) | Cutting (%) | Useful life index (m²/mm) | Useful life (%) |
|---|---|---|---|---|---|
| Comparative | 0.8 | 754.42 | 125 | 5.70 | 117 |
| Inventive | 0.8 | 793.22 | 132 | 5.88 | 121 |
| Conventional | 0.8 | 601.40 | 100 | 4.86 | 100 |

As shown in Table 1, Inventive Example exhibits superior cutting rate and useful life to Comparative and Conventional Examples.

The invention claimed is:

1. A diamond tool comprising a plurality of cutting segments,
   wherein each of the segments has a single plate-shaped layer or a plurality of plate-shaped layers of diamond particles arranged therein,
   wherein the layers of diamond particles are arranged in the cutting segment such that cutting grooves formed on a workpiece by trailing layers of diamond particles are arranged between cutting grooves formed thereon by leading layers of diamond particles, respectively, in cutting of the work piece,
   wherein the cutting segments each are divided into at least two sections such that n layers of diamond particles are arranged in a leading section in a cutting direction and n' layers of diamond particles are arranged in a trailing section in the cutting direction, where n'<=n, and
   wherein the layers of diamond particles in the leading section are arranged between the layers of diamond particles in the trailing section, respectively, in the cutting direction, by forming depressed portions on lateral sides of the segment by depressing lateral sides of the segment in a direction perpendicular to the cutting direction,
   wherein the layers of diamond particles in the leading section are spaced from each other, in a direction perpendicular to the cutting direction, by a distance less than or equal to a thickness of each layer of diamond particles in the trailing section,
   wherein the cutting segment has a high-concentration area and a low-concentration area in the cutting direction, the high-concentration area showing a concentration higher than an average concentration of the diamond particles, the low concentration area having no diamond particles, and at least one low concentration area formed on the leading section and the trailing section of the cutting segment.

2. The diamond tool according to claim 1, wherein the depressed portions are formed on one or both lateral sides of the cutting segment.

3. The diamond tool according to claim 2, wherein at least one of the depressed portions is formed on each lateral side of the cutting segment.

4. The diamond tool according to claim 1, wherein the low-concentration area is parallel in a direction perpendicular to the cutting direction.

5. The diamond tool according to claim 1, wherein the low-concentration area is tilted in a direction perpendicular to the cutting direction.

6. The diamond tool according to claim 1, the high-concentration area is formed across the leading and trailing sections of the cutting segment.

7. The diamond tool according to claim 4, wherein the high-concentration area is formed across the leading and trailing sections of the cutting segment.

8. The diamond tool according to claim 5, wherein the high-concentration area is formed across the leading and trailing sections of the cutting segment.

9. The diamond tool according to claim 1, the layers of diamond particles positioned on at least one lateral side of the cutting segment have diamond particles uniformly spaced from each other.

10. The diamond tool according to claim 4, wherein the layers of diamond particles positioned on at least one lateral side of the cutting segment have diamond particles uniformly spaced from each other.

11. The diamond tool according to claim 5, wherein the layers of diamond particles positioned on at least one lateral side of the cutting segment have diamond particles uniformly spaced from each other.

12. The diamond tool according to claim 6, wherein the layers of diamond particles positioned on at least one lateral side of the cutting segment have diamond particles uniformly spaced from each other.

13. The diamond tool according to claim 7, wherein the layers of diamond particles positioned on at least one lateral side of the cutting segment have diamond particles uniformly spaced from each other.

14. The diamond tool according to claim 4, wherein the low-concentration area has no diamond particles.

15. The diamond tool according to claim 5, wherein the low-concentration area has no diamond particles.

16. The diamond tool according to claim 7, wherein the low-concentration area has no diamond particles.

17. The diamond tool according to claim 9, wherein the low-concentration area has no diamond particles.

18. The diamond tool according to claim 10, wherein the low concentration area has no diamond particles.

19. The diamond tool according to claim 13, wherein the low-concentration area has no diamond particles.

20. The diamond tool according to claim 1, wherein the diamond particles are arranged at a predetermined tilt angle with respect to a line connecting upper vertices or a line connecting lower vertices of a cross section, cut parallel in a cutting direction and perpendicular to a cutting surface so that the diamond particles are protruded and uniformly spaced from each other on the cutting surface of the segment in cutting of the work piece.

21. The diamond tool according to claim 20, wherein the tilt angle is in the range of 15 to 45.

22. The diamond tool according to claim 1, wherein the leading layers of diamond particles are spaced from each other by a distance less than or equal to a thickness of each trailing layer of diamond particles.

23. The diamond tool according to claim 1, further comprising at least one cutting segment having diamond particles randomly dispersed therein along with the cutting segments each having a single plate-shaped layer or a plurality of plate-shaped layers of diamond particles arranged therein.

24. The diamond tool according to claim 1, wherein each of the segments has fillers dispersed therein.

25. The diamond tool according to claim 24, wherein the fillers comprise at least one selected from a group consisting of SiC, WC, BN, $Al_2O_3$ and diamond.

26. The diamond tool according to claim 25, wherein the fillers are diamond particles, which have a concentration that is 10% to 60% of the concentration of the diamond particles for cutting.

* * * * *